United States Patent
Li et al.

(10) Patent No.: US 11,825,297 B2
(45) Date of Patent: Nov. 21, 2023

(54) METHOD AND APPARATUS OF HANDLING CONTROL SIGNALING FOR INTER-USER EQUIPMENT (UE) COORDINATION INFORMATION IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW); Yi-Hsuan Kung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 18/088,830

(22) Filed: Dec. 27, 2022

(65) Prior Publication Data

US 2023/0232428 A1   Jul. 20, 2023

Related U.S. Application Data

(60) Provisional application No. 63/295,233, filed on Dec. 30, 2021.

(51) Int. Cl.
*H04W 72/25* (2023.01)
*H04W 72/566* (2023.01)
*H04W 72/1263* (2023.01)
*H04W 72/02* (2009.01)

(52) U.S. Cl.
CPC ....... *H04W 72/25* (2023.01); *H04W 72/1263* (2013.01); *H04W 72/569* (2023.01); *H04W 72/02* (2013.01)

(58) Field of Classification Search
None
See application file for complete search history.

(56) References Cited

U.S. PATENT DOCUMENTS

| | | | |
|---|---|---|---|
| 11,337,229 B2 | 5/2022 | Lee et al. | |
| 2022/0361147 A1* | 11/2022 | Sarkis | H04W 72/0446 |
| 2023/0026229 A1* | 1/2023 | Hui | H04L 1/1607 |
| 2023/0056574 A1* | 2/2023 | Hwang | H04W 72/25 |

FOREIGN PATENT DOCUMENTS

EP    4017194 A1    6/2022

* cited by examiner

*Primary Examiner* — Jutai Kao
(74) *Attorney, Agent, or Firm* — Cooper Legal Group LLC

(57) ABSTRACT

A method and apparatus are disclosed. In an example from the perspective of a first User Equipment (UE), the first UE generates a message requesting inter-UE coordination information, wherein the message includes information associated with a first priority value. The first UE generates a Medium Access Control (MAC) Protocol Data Unit (PDU) including the message. The first UE sets a value of a priority field in a first sidelink control information (SCI) based on a second priority value of the message, wherein the second priority value of the message is a configured value and/or a lowest priority value among a defined set of priority values. The first UE transmits the first SCI to one or more UEs including a second UE, wherein the first SCI schedules a first Physical Sidelink Shared Channel (PSSCH) transmission for transmitting the MAC PDU.

20 Claims, 9 Drawing Sheets

US 11,825,297 B2

METHOD AND APPARATUS OF HANDLING CONTROL SIGNALING FOR INTER-USER EQUIPMENT (UE) COORDINATION INFORMATION IN A WIRELESS COMMUNICATION SYSTEM

CROSS-REFERENCE TO RELATED APPLICATIONS

The present Application claims the benefit of U.S. Provisional Patent Application Ser. No. 63/295,233 filed on Dec. 30, 2021, the entire disclosure of which is incorporated herein in its entirety by reference.

FIELD

This disclosure generally relates to wireless communication networks, and more particularly, to a method and apparatus of handling control signaling for inter-User Equipment (UE) coordination information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first User Equipment (UE), the first UE generates a message requesting inter-UE coordination information, wherein the message comprises information associated with a first priority value. The first UE generates a Medium Access Control (MAC) Protocol Data Unit (PDU) comprising the message. The first UE sets a value of a priority field in a first sidelink control information (SCI) based on a second priority value of the message, wherein the second priority value of the message is a configured value and/or a lowest priority value among a defined set of priority values. The first UE transmits the first SCI to one or more UEs comprising a second UE, wherein the first SCI schedules a first Physical Sidelink Shared Channel (PSSCH) transmission for transmitting the MAC PDU.

In an example from the perspective of a first UE, the first UE generates a message requesting inter-UE coordination information, wherein the message comprises information associated with a first priority value. The first UE generates a MAC PDU comprising the message. The first UE sets a value of a priority field in a first SCI based on a second priority value of the message, wherein the second priority value of the message corresponds to the first priority value. The first UE transmits the first SCI to one or more UEs comprising a second UE, wherein the first SCI schedules a first PSSCH transmission for transmitting the MAC PDU.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.214 V16.7.0 (2021 September), "3GPP TSG RAN; NR Physical layer procedures for data (Release 16)"; 3GPP TS 38.213 V16.7.0 (2021 September), "3GPP TSG RAN; NR Physical layer procedures for control (Release 16)"; 3GPP TS 38.212 V16.7.0 (2021 September), "3GPP TSG RAN; NR Multiplexing and channel coding (Release 16)"; 3GPP TS 38.321 V16.6.0 (2021 September), "3GPP TSG RAN; NR Medium Access Control (MAC) protocol specification (Release 16)"; RP-202846, "WID revision: NR sidelink enhancement"; R1-2108692, Final Report of 3GPP TSG RAN WG1 #106-e v1.0.0 (Online meeting, 16-27 Aug. 2021); R1-2110751, Final Report of 3GPP TSG RAN WG1 #106bis-e v1.0.0 (Online meeting, 11-19 Oct. 2021); Draft Report of 3GPP TSG RAN WG1 #107-e v0.1.0 (Online meeting, 11-19 Nov. 2021); R1-2110845, "Inter-UE coordination in sidelink resource allocation", Huawei, HiSilicon; R1-2111515, "Design of Inter-UE Coordination Solutions for Sidelink Communication", Intel Corporation; R1-2112127, "Resource allocation for reliability and latency enhancements", NTT DOCOMO, INC.; R1-2112238, "Reliability and Latency Enhancements for Mode 2", Qualcomm Incorporated. The standards and documents listed above are hereby expressly incorporated by reference in their entirety.

Figure 1:
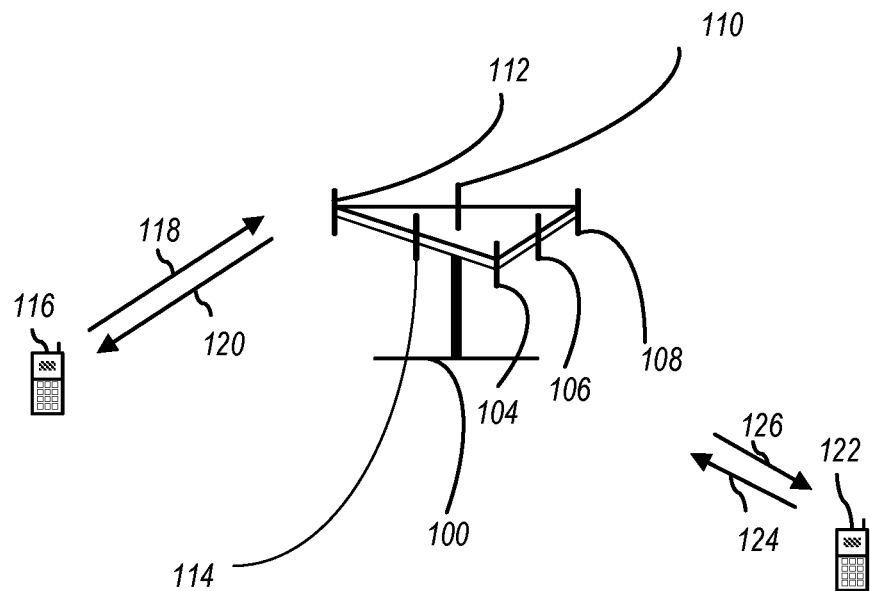
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
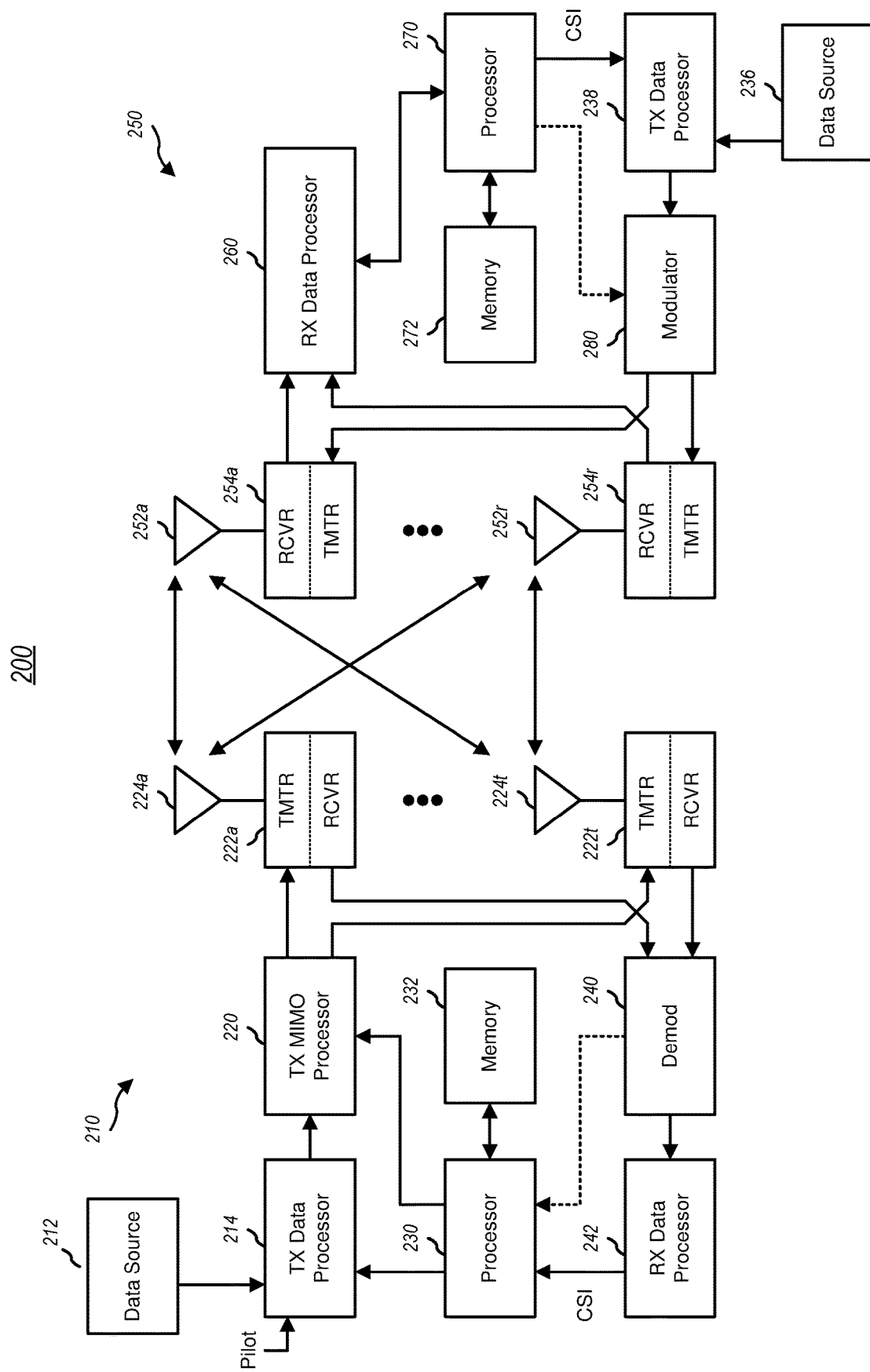
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
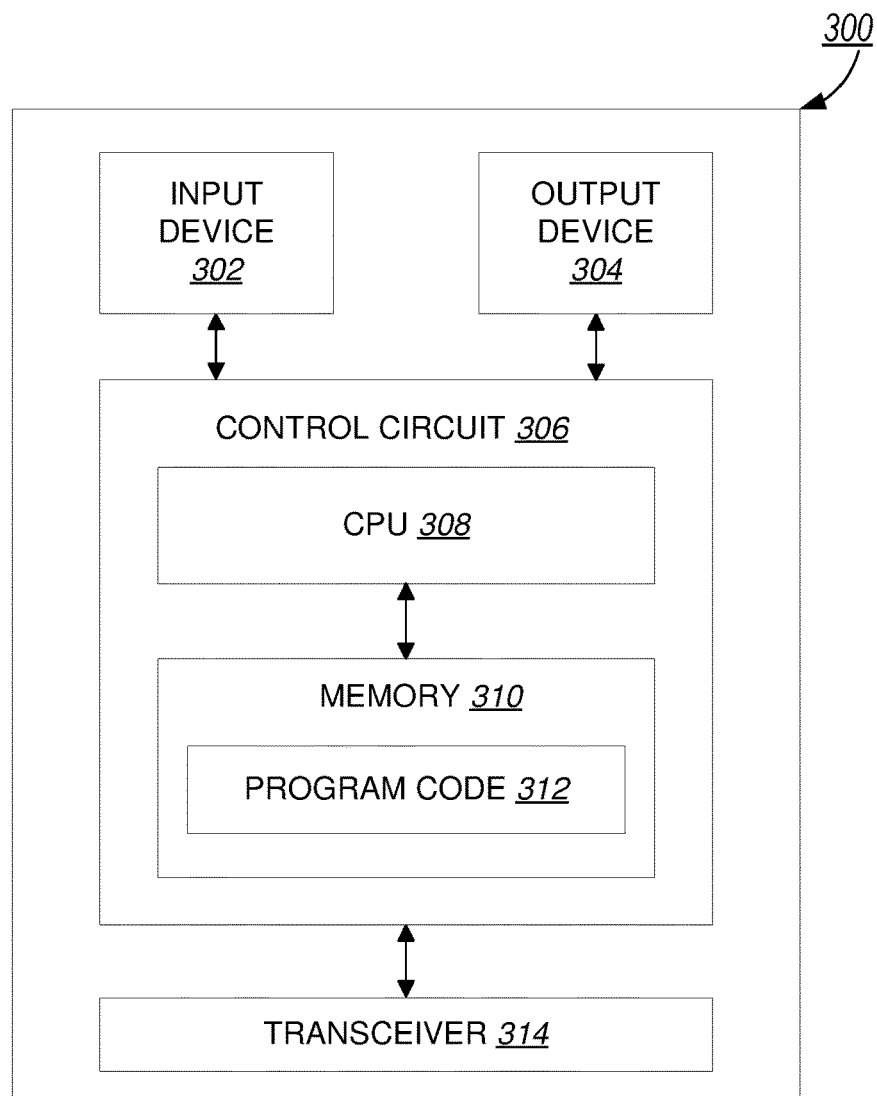
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
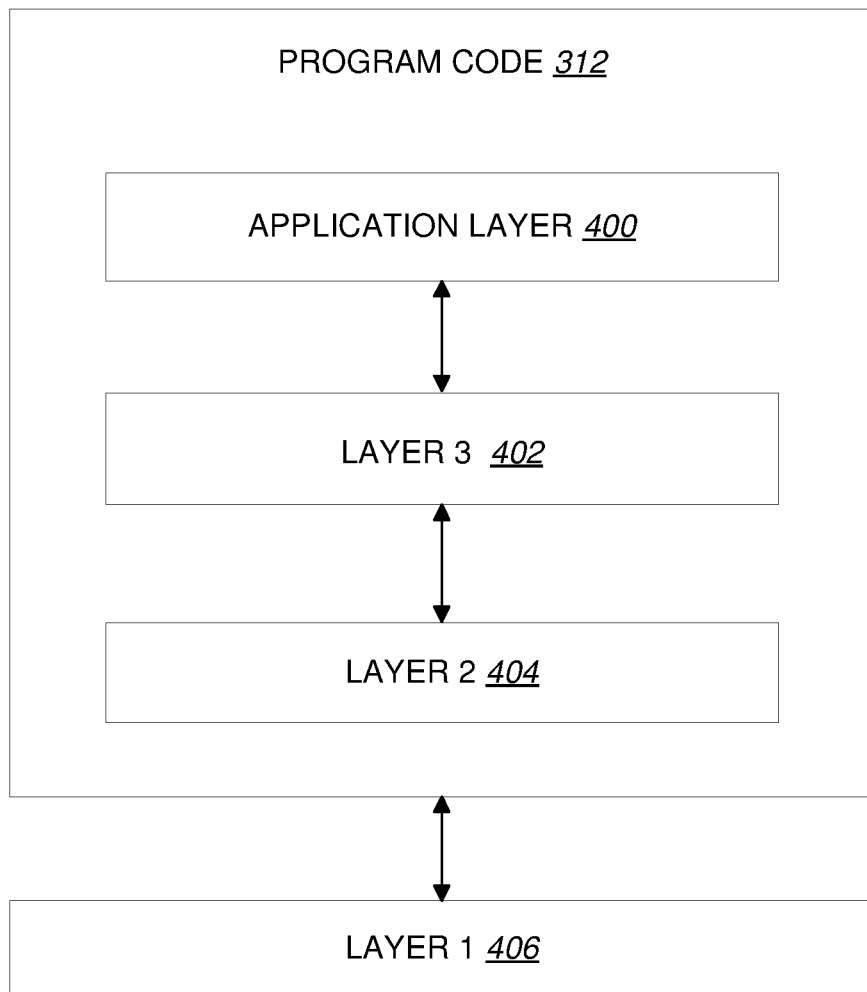
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 38.214 V16.7.0 discusses Physical Sidelink Shared Channel (PSSCH)-related procedure in NR. 3GPP TS 38.214 V16.7.0 discusses sidelink resource allocation mode 1 and sidelink resource allocation mode 2 for acquiring sidelink resources. One or more parts of 3GPP TS 38.214 V16.7.0 are quoted below:

8 Physical Sidelink Shared Channel Related Procedures
A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.
In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.
. . . .
The UE determines the set of slots assigned to a sidelink resource pool as follows:
  a bitmap $(b_0, b_1, \ldots, b_{L_{bitmap}-1})$ associated with the resource pool is used where L bitmap the length of the bitmap is configured by higher layers.
  a slot $t_k^{SL}$ $(0 \leq k < 10240 \times 2^\mu - N_{S_{SSB}} - N_{nonSL} - N_{reserved})$ belongs to the set if $b_{k'}=1$ where $k'=k \bmod L_{bitmap}$.
  The slots in the set are re-indexed such that the subscripts i of the remaining slots $t'_i^{SL}$ are successive $\{0, 1, \ldots, T'_{max}-1\}$ where $T'_{max}$ is the number of the slots remaining in the set.
The UE determines the set of resource blocks assigned to a sidelink resource pool as follows:
  The resource block pool consists of $N_{PRB}$ PRBs.
  The sub-channel m for m=0, 1, . . . , numSubchannel−1 consists of a set of $n_{subCHsize}$ contiguous resource blocks with the physical resource block number $n_{PRB}=n_{subCHRBstart}+m \cdot n_{subCHsize}+j$ for $j=0, 1, \ldots, n_{subCHsize}-1$, where $n_{subCHRBstart}$ and $n_{subCHsize}$ are given by higher layer parameters sl-StartRB-Subchannel and sl-SubchannelSize, respectively 8.1 UE Procedure for Transmitting the Physical Sidelink Shared Channel
Each PSSCH transmission is associated with an PSCCH transmission.
That PSCCH transmission carries the $1^{st}$ stage of the SCI associated with the PSSCH transmission; the $2^{nd}$ stage of the associated SCI is carried within the resource of the PSSCH.
If the UE transmits SCI format 1-A on PSCCH according to a PSCCH resource configuration in slot n and PSCCH resource m, then for the associated PSSCH transmission in the same slot
  one transport block is transmitted with up to two layers;
  The number of layers (v) is determined according to the 'Number of DMRS port' field in the SCI;
  The set of consecutive symbols within the slot for transmission of the PSSCH is determined according to clause 8.1.2.1;
  The set of contiguous resource blocks for transmission of the PSSCH is determined according to clause 8.1.2.2;
. . . .
The UE shall set the contents of the SCI format 2-A as follows:
  the UE shall set value of the 'HARQ process number' field as indicated by higher layers.
  the UE shall set value of the 'NDI' field as indicated by higher layers.
  the UE shall set value of the 'Redundancy version' field as indicated by higher layers.
  the UE shall set value of the 'Source ID' field as indicated by higher layers.
  the UE shall set value of the 'Destination ID' field as indicated by higher layers.
  the UE shall set value of the 'HARQ feedback enabled/disabled indicator' field as indicated by higher layers.
  the UE shall set value of the 'Cast type indicator' field as indicated by higher layers.
  the UE shall set value of the 'CSI request' field as indicated by higher layers.
. . . .
8.1.2 Resource Allocation
In sidelink resource allocation mode 1:
  for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].
8.1.2.1 Resource Allocation in Time Domain
The UE shall transmit the PSSCH in the same slot as the associated PSCCH.
The minimum resource allocation unit in the time domain is a slot.
The UE shall transmit the PSSCH in consecutive symbols within the slot, subject to the following restrictions:
  The UE shall not transmit PSSCH in symbols which are not configured for sidelink A symbol is configured for sidelink, according to higher layer parameters startSLsymbols and lengthSLsymbols, where startSLsymbols is the symbol index of the first symbol of lengthSLsymbols consecutive symbols configured for sidelink
. . .
In sidelink resource allocation mode 1:
  For sidelink dynamic grant, the PSSCH transmission is scheduled by a DCI format 3_0.
  For sidelink configured grant type 2, the configured grant is activated by a DCI format 3_0.
. . .

For sidelink configured grant type 1:
  The slot of the first sidelink transmissions follows the higher layer configuration according to [10, TS 38.321].

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

[ . . . ]

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
  L1 priority, $prio_{TX}$;
  the remaining packet delay budget;
  the number of sub-channels to be used for the PSSCH/PSCCH transmission in a slot, $L_{subCH}$;
  optionally, the resource reservation interval, $P_{rsvp\_TX}$, in units of msec.
  if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r_0', r_1', r_2', \ldots)$ which may be subject to pre-emption.
  it is up to UE implementation to determine the subset of resources as requested by higher layers before or after the slot $r_i''-T_3$, where $r_i''$ is the slot with the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:
  sl-SelectionWindowList: internal parameter $T_{2min}$ is set to the corresponding value from higher layer parameter sl-SelectionWindowList for the given value of $prio_{TX}$.
  sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.
  sl-RS-ForSensing selects if the UE uses the PSSCH-RSRP or PSCCH-RSRP measurement, as defined in clause 8.4.2.1.
  sl-ResourceReservePeriodList
  sl-SensingWindow: internal parameter $T_0$ is defined as the number of slots corresponding to sl-SensingWindow msec
  sl-TxPercentageList: internal parameter X for a given $prio_{TX}$ is defined as sl-TxPercentageList ($prio_{TX}$) converted from percentage to ratio
  sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$ according to clause 8.1.7.

Notation:
$(t'^{SL}_0, t'^{SL}_1, t'^{SL}_2, \ldots)$ denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub-channel x+j in slot $t'^{SL}_y$ where $j=0, \ldots, L_{subCH}-1$. The UE shall assume that any set of $L_{subCH}$ contiguous sub-channels included in the corresponding resource pool within the time interval $[n+T_1, n+T_2]$ correspond to one candidate single-slot resource, where
  selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
  if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i,p_j)$ is set to the corresponding value of RSRP threshold indicated by the i-th field in sl-Thres-RSRP-List, where $i=p_i+(p_j-1)*8$.

4) The set $S_A$ is initialized to the set of all the candidate single-slot resources.

5) The UE shall exclude any candidate single-slot resource $R_{x,y}$ from the set $S_A$ if it meets all the following conditions:
  the UE has not monitored slot $t'^{SL}_m$ in Step 2.
  for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.

5a) the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:
  a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $Th(prio_{RX}, prio_{TX})$;

c) the SCI format received in slot $t'^{SL}_m$ or the same SCI format which, if and only if the 'Resource reservation period' field is present in the received SCI format 1-A, is assumed to be received in slot(s) $t'^{SL}_{m+q \times P_{rsvp\_RX}'}$ determines according to clause 8.1.5 the set of resource blocks and slots which overlaps with $R_{x,y+j \times P_{rsvp\_TX}'}$, for q=1, 2, . . . , Q and j=0, 1, . . . , $C_{resel}$−1. Here, $P_{rsvp\_RX}'$ is $P_{rsvp\_RX}$ converted to units of logical slots according to clause 8.1.7, $$Q = \left\lceil \frac{T_{scal}}{P_{rsvp\_RX}'} \right\rceil$$

if $P_{rsvp\_RX}' < T_{scal}$ and $n'-m \leq P'_{rsvp\_RX}$, where $t'^{SL}_{n'} = n$ if slot n belongs to the set $(t'^{SL}_0, t'^{SL}_1, \ldots, t'^{SL}_{T'_{max}-1})$, otherwise slot $t'^{SL}_n$ is the first slot after slot n belonging to the set $(t'^{SL}_0, t'^{SL}_1, \ldots, t'^{SL}_{T'_{max}-1})$; otherwise Q=1. $T_{scal}$ is set to selection window size $T_2$ converted to units of msec.

7) If the number of candidate single-slot resources remaining in the set $S_A$ is smaller than $X \cdot M_{total}$, then $Th(p_i,p_j)$ is increased by 3 dB for each priority value $Th(p_i,p_j)$ and the procedure continues with step 4.

The UE shall report set $S_A$ to higher layers.

. . . .

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

[ . . . ]

8.2 UE Procedure for Transmitting Sidelink Reference Signals 8.2.1 CSI-RS Transmission Procedure A UE transmits sidelink CSI-RS within a unicast PSSCH transmission if the following conditions hold:

CSI reporting is enabled by higher layer parameter sl-CSI-Acquisition; and the 'CSI request' field in the corresponding SCI format 2-A is set to 1.

[ . . . ]

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

8.4 UE Procedure for Receiving Reference Signals 8.4.1 CSI-RS Reception Procedure The CSI-RS defined in Clause 8.4.1.5 of [4, TS 38.211] may be used for CSI computation.

[ . . . ]

8.5 UE Procedure for Reporting Channel State Information (CSI)

8.5.1 Channel State Information Framework

CSI consists of Channel Quality Indicator (CQI) and Rank Indicator (RI). The CQI and RI are always reported together.

8.5.1.1 Reporting Configurations

The UE shall calculate CSI parameters (if reported) assuming the following dependencies between CSI parameters (if reported)

CQI shall be calculated conditioned on the reported RI

The CSI reporting can be aperiodic (using [10, TS 38.321]). Table 8.5.1.1-1 shows the supported combinations of CSI reporting configurations and CSI-RS configurations and how the CSI reporting is triggered for CSI-RS configuration. Aperiodic CSI-RS is configured and triggered/activated as described in Clause 8.5.1.2.

TABLE 8.5.1.1-1

| Triggering/Activation of CSI reporting for the possible CSI-RS Configurations. | |
| --- | --- |
| CSI-RS Configuration | Aperiodic CSI Reporting |
| Aperiodic CSI-RS | Triggered by SCI. |

For CSI reporting, wideband CQI reporting is supported. A wideband CQI is reported for a single codeword for the entire CSI reporting band.

8.5.1.2 Triggering of Sidelink CSI Reports

The CSI-triggering UE is not allowed to trigger another aperiodic CSI report for the same UE before the last slot of the expected reception or completion of the ongoing aperiodic CSI report associated with the SCI format 2-A with the 'CSI request' field set to 1, where the last slot of the expected reception of the ongoing aperiodic CSI report is given by [10, TS38.321].

An aperiodic CSI report is triggered by an SCI format 2-A with the 'CSI request' field set to 1.

A UE is not expected to transmit a sidelink CSI-RS and a sidelink PT-RS which overlap.

8.5.2 Channel State Information 8.5.2.1 CSI Reporting Quantities 8.5.2.1.1 Channel Quality Indicator (CQI)

The UE shall derive CQI as specified in clause 5.2.2.1, with the following changes

. . .

8.5.2.2 Reference Signal (CSI-RS)

. . . .

Sidelink CSI-RS shall be transmitted according to [4, TS 38.211] in the resource blocks used for the PSSCH associated with the SCI format 2-A triggering a report.

8.5.2.3 CSI Reference Resource Definition

The CSI reference resource in sidelink is defined as follows:

In the frequency domain, the CSI reference resource is defined by the group of sidelink physical resource blocks containing the sidelink CSI-RS to which the derived CSI relates.

In the time domain, the CSI reference resource for a CSI reporting in sidelink slot n is defined by a single sidelink slot $n_{CSI\_ref}$ where $n_{CSI\_ref}$ is the same sidelink slot as the corresponding CSI request.

If configured to report CQI index and RI index, in the CSI reference resource, the UE shall assume the following for the purpose of deriving the CQI index and RI index:
   The reference resource uses the CP length and subcarrier spacing configured for the SL BWP.
   Redundancy Version 0.
   PSCCH occupies 2 OFDM symbols.
   The number of PSSCH and DM-RS symbols is equal to sl-LenghSymbols−2.
   Assume no REs allocated for sidelink CSI-RS.
   Assume no REs allocated SCI format 2-A or SCI format 2-B.
   Assume the same number of DM-RS symbols as the smallest one configured by the higher layer parameter sl-PSSCH-DMRS-TimePatternList.
   Assume no REs allocated for sidelink PT-RS.
   Assume sidelink CSI-RS RE power is the same as PSSCH RE power.
      The PSSCH transmission scheme where the UE may assume that PSSCH transmission would be performed with up to 2 transmission layers as defined in Clause 8.3.1.4 of [4, TS 38.211] . . . .
8.5.3 CSI Reporting
The UE can be configured with one CSI reporting latency bound as indicated by the higher layer parameter sl-LatencyBound-CSI-Report. CSI reporting is aperiodic and is described in [10, TS 38.321].

Sidelink control and feedback channel related procedure in NR are discussed in 3GPP TS 38.213 V16.7.0, one or more parts of which are quoted below:
16 UE Procedures for Sidelink
A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.
The UE expects to use a same numerology in the SL BWP and in an active UL BWP in a same carrier of a same cell. If the active UL BWP numerology is different than the SL BWP numerology, the SL BWP is deactivated.
[ . . . ]
16.3 UE Procedure for Reporting HARQ-ACK on Sidelink
A UE can be indicated by an SCI format scheduling a PSSCH reception to transmit a PSFCH with HARQ-ACK information in response to the PSSCH reception. The UE provides HARQ-ACK information that includes ACK or NACK, or only NACK.
A UE can be provided, by sl-PSFCH-Period, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if k mod $N^{PFSCH}_{PSSCH}=0$, where $t'^{SL}_k$ is defined in [6, TS 38.214], and $T'_{max}$ is a number of slots that belong to the resource pool within 10240 msec according to [6, TS 38.214], and $N^{PSFCH}_{PSSCH}$ is provided by sl-PSFCH-Period.

A UE may be indicated by higher layers to not transmit a PSFCH in response to a PSSCH reception [11, TS 38.321]. If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.
. . . .
16.3.1 UE Procedure for Receiving HARQ-ACK on Sidelink
A UE that transmitted a PSSCH scheduled by a SCI format 2-A or a SCI format 2-B that indicates HARQ feedback enabled, attempts to receive associated PSFCHs according to PSFCH resources determined as described in clause 16.3. The UE determines an ACK or a NACK value for HARQ-ACK information provided in each PSFCH resource as described in [10, TS 38.133]. The UE does not determine both an ACK value and a NACK value at a same time for a PSFCH resource.
For each PSFCH reception occasion, from a number of PSFCH reception occasions, the UE generates HARQ-ACK information to report to higher layers. For generating the HARQ-ACK information, the UE can be indicated by a SCI format to perform one of the following
   if the UE receives a PSFCH associated with a SCI format 2-A with Cast type indicator field value of "10"
      report to higher layers HARQ-ACK information with same value as a value of HARQ-ACK information that the UE determines from the PSFCH reception
   if the UE receives a PSFCH associated with a SCI format 2-A with Cast type indicator field value of "01"
      report an ACK value to higher layers if the UE determines an ACK value from at least one PSFCH reception occasion from the number of PSFCH reception occasions in PSFCH resources corresponding to every identity $M_{ID}$ of UEs that the UE expects to receive corresponding PSSCHs as described in clause 16.3; otherwise, report a NACK value to higher layers
   if the UE receives a PSFCH associated with a SCI format 2-B or a SCI format 2-A with Cast type indicator field value of "11"
      report to higher layers an ACK value if the UE determines absence of PSFCH reception for the PSFCH reception occasion; otherwise, report a NACK value to higher layers
16.4 UE Procedure for Transmitting PSCCH
A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.
A UE that transmits a PSCCH with SCI format 1-A using sidelink resource allocation mode 2 [6, TS 38.214] sets
   "Resource reservation period" as an index in sl-ResourceReservePeriodList corresponding to a reservation period provided by higher layers [11, TS 38.321], if the UE is provided sl-MultiReserveResource the values of the frequency resource assignment field and the time resource assignment field as described in [6, TS 38.214] to indicate N resources from a set $\{R_y\}$ of resources selected by higher layers as described in [11, TS 38.321] with N smallest slot indices $y_i$ for $0 \leq i \leq N-1$ such that $y_0 < y_1 < \ldots < y_{N-1} \leq y_0+31$, where:

$N=\min(N_{selected}, N_{max\_reserve})$, where $N_{selected}$ is a number of resources in the set $\{R_y\}$ with slot indices $y_j$, $0 \leq j \leq N_{selected}-1$, such that $y_0 < y_1 < \ldots < y_{N_{selected}-1} \leq y_0+31$, and $N_{max\_reserve}$ is provided by sl-MaxNumPerReserve each resource, from the set of $\{R_y\}$ resources, corresponds to $L_{subCH}$ contiguous sub-channels and a slot in a set of slots $\{t'_y{}^{SL}\}$, where $L_{subCH}$ is the number of sub-channels available for PSSCH/PSCCH transmission in a slot $(t'_0{}^{SL}, t'_1{}^{SL}, t'_2{}^{SL}, \ldots)$ is a set of slots in a sidelink resource pool [6, TS 38.214]

$y_0$ is an index of a slot where the PSCCH with SCI format 1-A is transmitted.

A UE that transmits a PSCCH with SCI format 1-A using sidelink resource allocation mode 1 [6, TS 38.214] sets the values of the frequency resource assignment field and the time resource assignment field for the SCI format 1-A transmitted in the m-th resource for PSCCH/PSSCH transmission provided by a dynamic grant or by a SL configured grant, where $m=\{1, \ldots, M\}$ and M is the total number of resources for PSCCH/PSSCH transmission provided by a dynamic grant or the number of resources for PSCCH/PSSCH transmission in a period provided by a SL configured grant type 1 or SL configured grant type 2, as follows:

the frequency resource assignment field and time resource assignment field indicate the m-th to M-th resources as described in [6, TS 38.214].

For decoding of a SCI format 1-A, a UE may assume that a number of bits provided by sl-NumReservedBits can have any value.

Sidelink control information (SCI) and Downlink Control Information (DCI) associated with SL grant in NR are discussed in 3GPP TS 38.212 V16.7.0, one or more parts of which are quoted below:

7.3.1 DCI Formats

The DCI formats defined in table 7.3.1-1 are supported.

TABLE 7.3.1-1

DCI formats

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| . . . | . . . |
| 3_0 | Scheduling of NR sidelink in one cell |
| 3_1 | Scheduling of LTE sidelink in one cell |

[ . . . ]

7.3.1.4 DCI Formats for Scheduling of Sidelink 7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—$\lceil \log_2 I \rceil$ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—4 bits.

New data indicator—1 bit.

Lowest index of the subchannel allocation to the initial transmission—$\lceil \log_2(N_{subChannel}{}^{SL}1) \rceil$ bits as defined in clause 8.1.2.2 of [6, TS 38.214]

SCI format 1-A fields according to clause 8.3.1.1:
Frequency resource assignment.
Time resource assignment.

PSFCH-to-HARQ feedback timing indicator—$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]

PUCCH resource indicator—3 bits as defined in clause 16.5 of [5, TS 38.213].

Configuration index—0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits
2 bits as defined in clause 16.5.2 of [5, TS 38.213] if the UE is configured with pdsch-HARQ-ACK-Codebook=dynamic
2 bits as defined in clause 16.5.1 of [5, TS 38.213] if the UE is configured with pdsch-HARQ-ACK-Codebook=semi-static Padding bits, if required

[ . . . ]

8.3 Sidelink Control Information on PSCCH

SCI carried on PSCCH is a 1"-stage SCI, which transports sidelink scheduling information.

. . . .

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment—

$$\left\lceil \log_2\left(\frac{N_{subChannel}^{SL}\left(N_{subChannel}^{SL}+1\right)}{2}\right) \right\rceil$$

bits when the value of the higher layer parameter sl-MaxNumPerReserve is configured to 2; otherwise $$\left\lceil \log_2\left(\frac{N_{subChannel}^{SL}\left(N_{subChannel}^{SL}+1\right)\left(2N_{subChannel}^{SL}+1\right)}{6}\right) \right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

TABLE 8.3.1.1-1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

. . . .

8.4 Sidelink Control Information on PSSCH

SCI carried on PSSCH is a $2^{nd}$-stage SCI, which transports sidelink scheduling information.

. . . 8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.
New data indicator—1 bit.
Redundancy version—2 bits as defined in Table 7.3.1.1-2.
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Cast type indicator—2 bits as defined in Table 8.4.1.1-1 and in clause 8.1 of [6, TS 38.214].
CSI request—1 bit as defined in clause 8.2.1 of [6, TS 38.214] and in clause 8.1 of [6, TS 38.214].

TABLE 8.4.1.1-1

Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

. . . .

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

Figure 5:
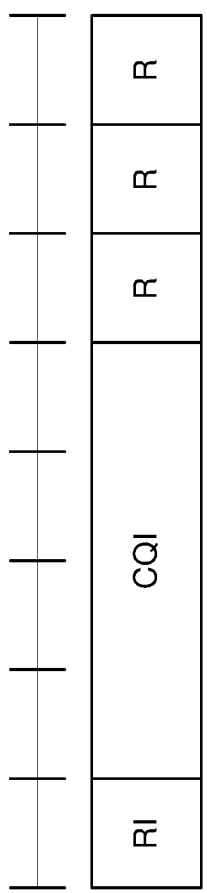
FIG. 5 illustrates an example of a sidelink Channel State Information (CSI) reporting Medium Access Control (MAC) Control Element (CE) according to one exemplary embodiment.
Figure 6:
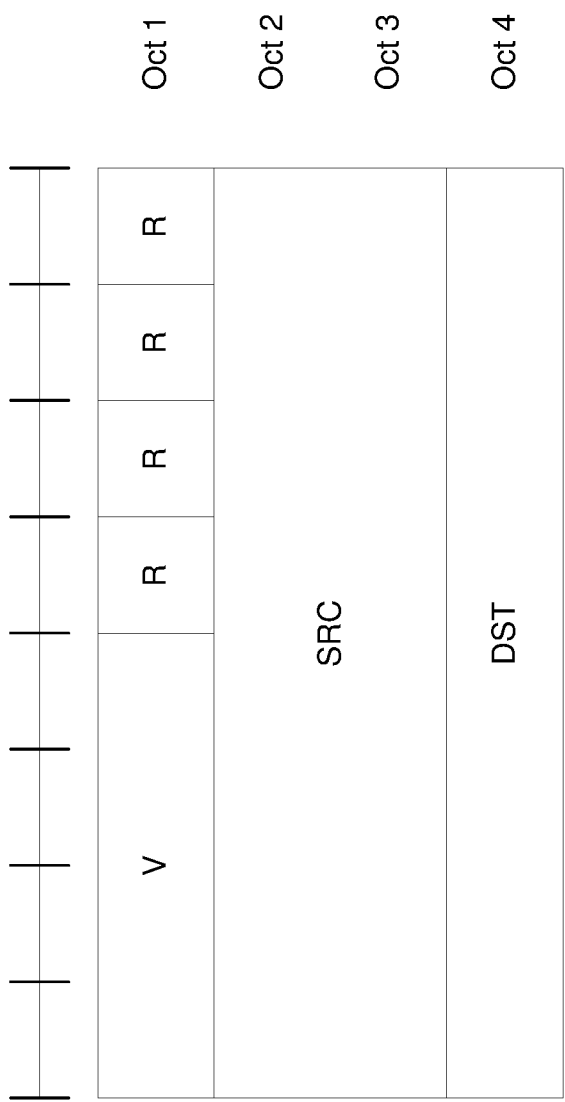
FIG. 6 illustrates an example of a Sidelink-Shared Channel (SL-SCH) MAC subheader according to one exemplary embodiment.
Figure 7:
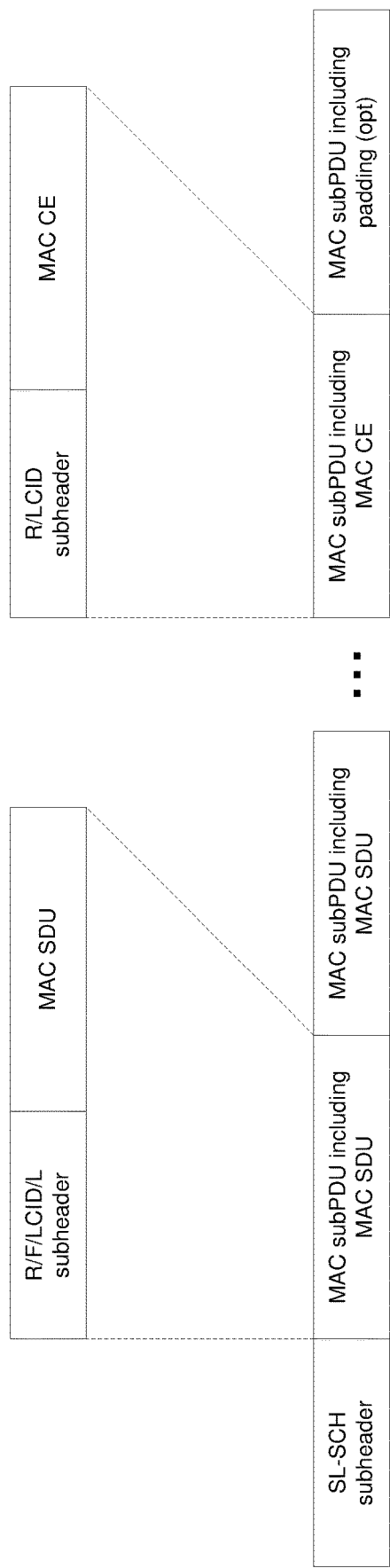
FIG. 7 illustrates an example of a sidelink MAC Protocol Data Unit (PDU) according to one exemplary embodiment.

Sidelink-related procedure in MAC layer in NR Uu are discussed in 3GPP TS 38.321 V16.6.0. Notably, FIG. 6.1.3.35-1 of Section 6.1.3.35 of 3GPP TS 38.321 V16.6.0, entitled "Sidelink CSI Reporting MAC CE", is reproduced herein as FIG. 5. FIG. 6.1.6-1 of Section 6.1.6 of 3GPP TS 38.321 V16.6.0, entitled "SL-SCH MAC subheader", is reproduced herein as FIG. 6. FIG. 6.1.6-2 of Section 6.1.6 of 3GPP TS 38.321 V16.6.0, entitled "Example of a SL MAC PDU", is reproduced herein as FIG. 7. One or more parts of 3GPP TS 38.321 V16.6.0 are quoted below:

5.22 SL-SCH Data Transfer 5.22.1 SL-SCH Data Transmission 5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:

1> if a sidelink grant has been received on the PDCCH for the MAC entity's SL-RNTI:
  2> if the NDI received on the PDCCH has not been toggled compared to the value in the previously received HARQ information for the HARQ Process ID:
    3> use the received sidelink grant to determine PSCCH duration(s) and PSSCH duration(s) for one or more retransmissions of a single MAC PDU for the corresponding Sidelink process according to clause 8.1.2 of TS 38.214 [7].

2> else:
- 3> use the received sidelink grant to determine PSCCH duration(s) and PSSCH duration(s) for initial transmission and, if available, retransmission(s) of a single MAC PDU according to clause 8.1.2 of TS 38.214 [7].
2> if a sidelink grant is available for retransmission(s) of a MAC PDU which has been positively acknowledged as specified in clause 5.22.1.3.1a:
- 3> clear the PSCCH duration(s) and PSSCH duration(s) corresponding to retransmission(s) of the MAC PDU from the sidelink grant.

1> else if a sidelink grant has been received on the PDCCH for the MAC entity's SLCS-RNTI:
2> if PDCCH contents indicate retransmission(s) for the identified HARQ process ID that has been set for an activated configured sidelink grant identified by sl-ConfigIndexCG:
- 3> use the received sidelink grant to determine PSCCH duration(s) and PSSCH duration(s) for one or more retransmissions of a single MAC PDU according to clause 8.1.2 of TS 38.214 [7].
2> else if PDCCH contents indicate configured grant Type 2 deactivation for a configured sidelink grant:
- 3> trigger configured sidelink grant confirmation for the configured sidelink grant.
2> else if PDCCH contents indicate configured grant Type 2 activation for a configured sidelink grant:
- 3> trigger configured sidelink grant confirmation for the configured sidelink grant;
- 3> store the configured sidelink grant;
- 3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 based on sensing or random selection, the MAC entity shall for each Sidelink process:

1> if the MAC entity has selected to create a selected sidelink grant corresponding to transmissions of multiple MAC PDUs, and SL data is available in a logical channel:
2> if the MAC entity has not selected a pool of resources allowed for the logical channel:
- 3> if sl-HARQ-FeedbackEnabled is set to enabled for the logical channel:
  - 4> select any pool of resources configured with PSFCH resources among the pools of resources;
- 3> else:
  - 4> select any pool of resources among the pools of resources;
2> perform the TX resource (re-)selection check on the selected pool of resources as specified in clause 5.22.1.2;
NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.
2> if the TX resource (re-)selection is triggered as the result of the TX resource (re-)selection check:
- 3> select one of the allowed values configured by RRC in sl-ResourceReservePeriodList and set the resource reservation interval, $P_{rsvp\_TX}$, with the selected value;
- 3> randomly select, with equal probability, an integer value in the interval [5, 15] for the resource reservation interval higher than or equal to 100 ms or in the interval $$\left[5 \times \left\lceil \frac{100}{\max(20 P_{rsvp\_TX})} \right\rceil, 15 \times \left\lceil \frac{100}{\max(20 P_{rsvp\_TX})} \right\rceil \right]$$

for the resource reservation interval lower than 100 ms and set SL_RESOURCE_RESELECTION_COUNTER to the selected value;
- 3> select the number of HARQ retransmissions from the allowed numbers that are configured by RRC in sl-Max TxTransNumPSSCH included in sl-PSSCH-TxConfigList and, if configured by RRC, overlapped in sl-Max TxTransNumPSSCH indicated in sl-CBR-PriorityTxConfigList for the highest priority of the logical channel(s) allowed on the carrier and the CBR measured by lower layers according to clause 5.1.27 of TS 38.215 if CBR measurement results are available or the corresponding sl-defaultTxConfigIndex configured by RRC if CBR measurement results are not available;
- 3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 if CBR measurement results are available or the corresponding sl-defaultTxConfigIndex configured by RRC if CBR measurement results are not available;
- 3> if transmission based on random selection is configured by upper layers:
  - 4> randomly select the time and frequency resources for one transmission opportunity from the resources pool, according to the amount of selected frequency resources and the remaining PDB of SL data available in the logical channel(s) allowed on the carrier.
- 3> else:
  - 4> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
- 3> use the randomly selected resource to select a set of periodic resources spaced by the resource reservation interval for transmissions of PSCCH and PSSCH corresponding to the number of transmission opportunities of MAC PDUs determined in TS 38.214 [7];

3> if one or more HARQ retransmissions are selected:
  4> if transmission based on sensing is configured by upper layers and there are available resources left in the resources indicated by the physical layer according to clause 8.1.4 of TS 38.214 [7] for more transmission opportunities; or
  4> if transmission based on random selection is configured by upper layers and there are available resources left in the resource pool for more transmission opportunities:
    5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
    5> use the randomly selected resource to select a set of periodic resources spaced by the resource reservation interval for transmissions of PSCCH and PSSCH corresponding to the number of retransmission opportunities of the MAC PDUs determined in TS 38.214 [7];
    5> consider the first set of transmission opportunities as the initial transmission opportunities and the other set(s) of transmission opportunities as the retransmission opportunities;
    5> consider the sets of initial transmission opportunities and retransmission opportunities as the selected sidelink grant.
3> else:
  4> consider the set as the selected sidelink grant.
3> use the selected sidelink grant to determine the set of PSCCH durations and the set of PSSCH durations according to TS 38.214 [7].
2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:
  3> clear the selected sidelink grant, if available;
  3> randomly select, with equal probability, an integer value in the interval [5, 15] for the resource reservation interval higher than or equal to 100 ms or in the interval $$\left[ 5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
  3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].
1> if the MAC entity has selected to create a selected sidelink grant corresponding to transmission(s) of a single MAC PDU, and if SL data is available in a logical channel, or a SL-CSI reporting is triggered:
  2> if SL data is available in the logical channel:
    3> if sl-HARQ-FeedbackEnabled is set to enabled for the logical channel:
      4> select any pool of resources configured with PSFCH resources among the pools of resources;
    3> else:
      4> select any pool of resources among the pools of resources;
  2> else if a SL-CSI reporting is triggered:
    3> select any pool of resources among the pools of resources.
  2> perform the TX resource (re-)selection check on the selected pool of resources as specified in clause 5.22.1.2;
  2> if the TX resource (re-)selection is triggered as the result of the TX resource (re-)selection check:
    3> select the number of HARQ retransmissions from the allowed numbers that are configured by RRC in sl-Max TxTransNumPSSCH included in sl-PSSCH-TxConfigList and, if configured by RRC, overlapped in sl-Max TxTransNumPSSCH indicated in sl-CBR-PriorityTxConfigList for the highest priority of the logical channel(s) allowed on the carrier and the CBR measured by lower layers according to clause 5.1.27 of TS 38.215 if CBR measurement results are available or the corresponding sl-defaultTxConfigIndex configured by RRC if CBR measurement results are not available;
    3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 if CBR measurement results are available or the corresponding sl-defaultTxConfigIndex configured by RRC if CBR measurement results are not available;
    3> if transmission based on random selection is configured by upper layers:
      4> randomly select the time and frequency resources for one transmission opportunity from the resources pool, according to the amount of selected frequency resources and the remaining PDB of SL data available in the logical channel(s) allowed on the carrier, and the latency requirement of the triggered SL CSI reporting;
    3> else:
      4> randomly select the time and frequency resources for one transmission opportunity from the resources indicated by the physical layer as specified in clause 8.1.4 of TS 38.214

[7], according to the amount of selected frequency resources and the remaining PDB of SL data available in the logical channel(s) allowed on the carrier, and/or the latency requirement of the triggered SL-CSI reporting;
3> if one or more HARQ retransmissions are selected:
4> if transmission based on sensing is configured by upper layers and there are available resources left in the resources indicated by the physical layer according to clause 8.1.4 of TS 38.214 [7] for more transmission opportunities; or
4> if transmission based on random selection is configured by upper layers and there are available resources left in the resources pool for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
5> consider a transmission opportunity which comes first in time as the initial transmission opportunity and other transmission opportunities as the retransmission opportunities;
5> consider all the transmission opportunities as the selected sidelink grant;
3> else:
4> consider the set as the selected sidelink grant;
3> use the selected sidelink grant to determine PSCCH duration(s) and PSSCH duration(s) according to TS 38.214 [7].
1> if a selected sidelink grant is available for retransmission(s) of a MAC PDU which has been positively acknowledged as specified in clause 5.22.1.3.3:
2> clear the PSCCH duration(s) and PSSCH duration(s) corresponding to retransmission(s) of the MAC PDU from the selected sidelink grant.
For a selected sidelink grant, the minimum time gap between any two selected resources comprises:
a time gap between the end of the last symbol of a PSSCH transmission of the first resource and the start of the first symbol of the corresponding PSFCH reception determined by sl-MinTimeGapPSFCH and sl-PSFCH-Period for the pool of resources; and
a time required for PSFCH reception and processing plus sidelink retransmission preparation including multiplexing of necessary physical channels and any TX-RX/RX-TX switching time.
The MAC entity shall for each PSSCH duration:
1> for each sidelink grant occurring in this PSSCH duration:
2> select a MCS table allowed in the pool of resource which is associated with the sidelink grant;
2> if the MAC entity has been configured with Sidelink resource allocation mode 1:
3> select a MCS which is, if configured, within the range that is configured by RRC between sl-MinMCS-PSSCH and sl-MaxMCS-PSSCH associated with the selected MCS table included in sl-ConfigDedicatedNR;
3> set the resource reservation interval to 0ms.
2> else:
3> select a MCS which is, if configured, within the range that is configured by RRC between sl-MinMCS-PSSCH and sl-MaxMCS-PSSCH associated with the selected MCS table included in sl-PSSCH-TxConfigList and, if configured by RRC, overlapped between sl-MinMCS-PSSCH and sl-MaxMCS-PSSCH associated with the selected MCS table indicated in sl-CBR-PriorityTxConfigList for the highest priority of the sidelink logical channel(s) in the MAC PDU and the CBR measured by lower layers according to clause 5.1.27 of TS 38.215 if CBR measurement results are available or the corresponding sl-defaultTxConfigIndex configured by RRC if CBR measurement results are not available;
3> if the MAC entity decides not to use the selected sidelink grant for the next PSSCH duration corresponding to an initial transmission opportunity:
4> set the resource reservation interval to 0ms.
3> else:
4> set the resource reservation interval to the selected value.
2> if the configured sidelink grant has been activated and this PSSCH duration corresponds to the first PSSCH transmission opportunity within this sl-PeriodCG of the configured sidelink grant:
3> set the HARQ Process ID to the HARQ Process ID associated with this PSSCH duration and, if available, all subsequent PSSCH duration(s) occurring in this sl-PeriodCG for the configured sidelink grant;
3> determine that this PSSCH duration is used for initial transmission;
3> flush the HARQ buffer of Sidelink process associated with the HARQ Process ID.
2> deliver the sidelink grant, the selected MCS, and the associated HARQ information to the Sidelink HARQ Entity for this PSSCH duration.
For configured sidelink grants, the HARQ Process ID associated with the first slot of a SL transmission is derived from the following equation:

HARQ Process ID=[floor(CURRENT_slot/PeriodicitySL)]modulo sl-NrOfHARQ-Processes+sl-HARQ-ProcID-offset where CURRENT_slot refers to current logical slot in the associated resource pool, and PeriodicitySL is defined in clause 5.8.3.

. . . .

5.22.1.3 Sidelink HARQ Operation
5.22.1.3.1 Sidelink HARQ ENTITY
The MAC entity includes at most one Sidelink HARQ entity for transmission on SL-SCH, which maintains a number of parallel Sidelink processes.
The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission as specified in clause 5.22.1.1; or
1> if the sidelink grant is a configured sidelink grant and no MAC PDU has been obtained in a sl-PeriodCG of the configured sidelink grant:
NOTE 1: Void.
2> (re-)associate a Sidelink process to this grant, and for the associated Sidelink process:
NOTE 1A: The Sidelink HARQ Entity will associate the selected sidelink grant to the Sidelink process determined by the MAC entity.
3> obtain the MAC PDU to transmit from the Multiplexing and assembly entity, if any;
3> if a MAC PDU to transmit has been obtained:
4> if a HARQ Process ID has been set for the sidelink grant:
5> (re-)associate the HARQ Process ID corresponding to the sidelink grant to the Sidelink process;
NOTE 1a: There is one-to-one mapping between a HARQ Process ID and a Sidelink process in the MAC entity configured with Sidelink resource allocation mode 1.
4> determines Sidelink transmission information of the TB for the source and destination pair of the MAC PDU as follows:
5> set the Source Layer-1 ID to the 8 LSB of the Source Layer-2 ID of the MAC PDU;
5> set the Destination Layer-1 ID to the 16 LSB of the Destination Layer-2 ID of the MAC PDU;
5> (re-)associate the Sidelink process to a Sidelink process ID;
5> consider the NDI to have been toggled compared to the value of the previous transmission corresponding to the Sidelink identification information and the Sidelink process ID of the MAC PDU and set the NDI to the toggled value;
5> set the cast type indicator to one of broadcast, groupcast and unicast as indicated by upper layers;
5> if HARQ feedback has been enabled for the MAC PDU according to clause 5.22.1.4.2;
6> set the HARQ feedback enabled/disabled indicator to enabled.
5> else:
6> set the HARQ feedback enabled/disabled indicator to disabled.
5> set the priority to the value of the highest priority of the logical channel(s), if any, and a MAC CE, if included, in the MAC PDU;
5> . . .
4> deliver the MAC PDU, the sidelink grant and the Sidelink transmission information of the TB to the associated Sidelink process;
4> instruct the associated Sidelink process to trigger a new transmission.
3> else:
4> flush the HARQ buffer of the associated Sidelink process.
1> else (i.e. retransmission):
2> if the HARQ Process ID corresponding to the sidelink grant received on PDCCH, the configured sidelink grant or the selected sidelink grant is associated to a Sidelink process of which HARQ buffer is empty; or
2> if the HARQ Process ID corresponding to the sidelink grant received on PDCCH is not associated to any Sidelink process:
3> ignore the sidelink grant.
2> else:
3> identify the Sidelink process associated with this grant, and for the associated Sidelink process:
4> deliver the sidelink grant of the MAC PDU to the associated Sidelink process;
4> instruct the associated Sidelink process to trigger a retransmission.

5.22.1.3.1a Sidelink Process

The Sidelink process is associated with a HARQ buffer. New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU is determined by the highest priority of the logical channel(s) or a MAC CE in the MAC PDU.

If the Sidelink HARQ Entity requests a new transmission, the Sidelink process shall:
1> store the MAC PDU in the associated HARQ buffer;
1> store the sidelink grant received from the Sidelink HARQ Entity;
1> generate a transmission as described below.

If the Sidelink HARQ Entity requests a retransmission, the Sidelink process shall:
1> store the sidelink grant received from the Sidelink HARQ Entity;
1> generate a transmission as described below.

To generate a transmission, the Sidelink process shall:
1> if there is no uplink transmission; or
1> if the MAC entity is able to simultaneously perform uplink transmission(s) and sidelink transmission at the time of the transmission; or
1> if the other MAC entity and the MAC entity are able to simultaneously perform uplink transmission(s) and sidelink transmission at the time of the transmission respectively; or
1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if HARQ feedback has been enabled the MAC PDU according to clause 5.22.1.4.2:
3> instruct the physical layer to monitor PSFCH for the transmission and perform PSFCH reception as specified in clause 5.22.1.3.2.

2> if sl-PUCCH-Config is configured by RRC for the stored sidelink grant:
3> determine transmission of an acknowledgement on the PUCCH as specified in clause 5.22.1.3.2.
1> if this transmission corresponds to the last transmission of the MAC PDU:
2> decrement SL_RESOURCE_RESELECTION_COUNTER by 1, if available.
1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or
1> if a positive acknowledgement to this transmission of the MAC PDU was received according to clause 5.22.1.3.2; or
1> if negative-only acknowledgement was enabled in the SCI and no negative acknowledgement was received for this transmission of the MAC PDU according to clause 5.22.1.3.2:
2> flush the HARQ buffer of the associated Sidelink process.

The transmission of the MAC PDU is prioritized over uplink transmissions of the MAC entity or the other MAC entity if the following conditions are met:
1> if the MAC entity is not able to perform this sidelink transmission simultaneously with all uplink transmissions at the time of the transmission, and
1> if uplink transmission is neither prioritized as specified in clause 5.4.2.2 nor prioritized by upper layer according to TS 23.287 [19]; and
1> if sl-PrioritizationThres is configured and if the value of the highest priority of logical channel(s) or a MAC CE in the MAC PDU is lower than sl-PrioritizationThres.
[ . . . ]

5.22.1.4 Multiplexing and Assembly
For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.
5.22.1.4.1 Logical Channel Prioritization
5.22.1.4.4.4 General
The sidelink Logical Channel Prioritization procedure is applied whenever a new transmission is performed.
RRC controls the scheduling of sidelink data by signalling for each logical channel:
  sl-Priority where an increasing priority value indicates a lower priority level;
  sl-PrioritisedBitRate which sets the sidelink Prioritized Bit Rate (sPBR);
  sl-BucketSizeDuration which sets the sidelink Bucket Size Duration (sBSD).
RRC additionally controls the LCP procedure by configuring mapping restrictions for each logical channel:
  sl-configuredGrantType1Allowed which sets whether a configured grant Type 1 can be used for sidelink transmission;
  sl-AllowedCG-List which sets the allowed configured grant(s) for sidelink transmission;
  sl-HARQ-FeedbackEnabled which sets whether the logical channel is allowed to be multiplexed with logical channel(s) with sl-HARQ-FeedbackEnabled set to enabled or disabled.

The following UE variable is used for the Logical channel prioritization procedure:
  SBj which is maintained for each logical channel j.
The MAC entity shall initialize SBj of the logical channel to zero when the logical channel is established.
For each logical channel j, the MAC entity shall:
  1> increment SBj by the product sPBR×T before every instance of the LCP procedure, where T is the time elapsed since SBj was last incremented;
  1> if the value of SBj is greater than the sidelink bucket size (i.e. sPBR×sBSD):
    2> set SBj to the sidelink bucket size.
5.22.1.4.1.2 Selection of Logical Channels
The MAC entity shall for each SCI corresponding to a new transmission:
  1> select a Destination associated to one of unicast, groupcast and broadcast, having at least one of the MAC CE and the logical channel with the highest priority, among the logical channels that satisfy all the following conditions and MAC CE(s), if any, for the SL grant associated to the SCI:
    2> SL data is available for transmission; and
    2> SBj>0, in case there is any logical channel having SBj>0; and
    2> sl-configuredGrantType1Allowed, if configured, is set to true in case the SL grant is a Configured Grant Type 1; and
    2> sl-AllowedCG-List, if configured, includes the configured grant index associated to the SL grant; and
    2> sl-HARQ-FeedbackEnabled is set to disabled, if PSFCH is not configured for the SL grant associated to the SCI.
  NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.
  1> select the logical channels satisfying all the following conditions among the logical channels belonging to the selected Destination:
    2> SL data is available for transmission; and
    2> sl-configuredGrantType1Allowed, if configured, is set to true in case the SL grant is a Configured Grant Type 1; and.
    2> sl-AllowedCG-List, if configured, includes the configured grant index associated to the SL grant; and
      3> if PSFCH is configured for the sidelink grant associated to the SCI:
        4> sl-HARQ-FeedbackEnabled is set to enabled, if sl-HARQ-FeedbackEnabled is set to enabled for the highest priority logical channel satisfying the above conditions; or
        4> sl-HARQ-FeedbackEnabled is set to disabled, if sl-HARQ-FeedbackEnabled is set to disabled for the highest priority logical channel satisfying the above conditions.
      3> else:
        4> sl-HARQ-FeedbackEnabled is set to disabled.
  NOTE 2: sl-HARQ-FeedbackEnabled is set to disabled for the transmission of a MAC PDU only carrying CSI reporting MAC CE.
5.22.1.4.1.3 Allocation of Sidelink Resources
The MAC entity shall for each SCI corresponding to a new transmission:
  1> allocate resources to the logical channels as follows:
    2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);

2> decrement SBj by the total size of MAC SDUs served to logical channel j above;

2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

NOTE: The value of SBj can be negative.

The UE shall also follow the rules below during the SL scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data;

if the MAC entity is given a sidelink grant size that is equal to or larger than 12 bytes while having data available and allowed (according to clause 5.22.1.4.1) for transmission, the MAC entity shall not transmit only padding;

A logical channel configured with sl-HARQ-Feedback-Enabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:

there is no Sidelink CSI Reporting MAC CE generated for this PSSCH transmission as specified in clause 5.22.1.7; and the MAC PDU includes zero MAC SDUs.

Logical channels shall be prioritised in accordance with the following order (highest priority listed first):

data from SCCH;

Sidelink CSI Reporting MAC CE;

data from any STCH.

5.22.1.4.2 Multiplexing of MAC Control Elements and MAC SDUs

The MAC entity shall multiplex a MAC CE and MAC SDUs in a MAC PDU according to clauses and 6.1.6.

[ . . . ]

5.22.1.7 CSI Reporting

The Sidelink Channel State Information (SL-CSI) reporting procedure is used to provide a peer UE with sidelink channel state information as specified in clause 8.5 of TS 38.214 [7]. RRC configures the following parameters to control the SL-CSI reporting procedure:

sl-LatencyBoundCSI-Report, which is maintained for each PC5-RRC connection.

The MAC entity maintains a sl-CSI-ReportTimer for each pair of the Source Layer-2 ID and the Destination Layer-2 ID corresponding to a PC5-RRC connection. sl-CSI-ReportTimer is used for a SL-CSI reporting UE to follow the latency requirement signalled from a CSI triggering UE. The value of sl-CSI-ReportTimer is the same as the latency requirement of the SL-CSI reporting in sl-LatencyBound-CSI-Report configured by RRC.

The MAC entity shall for each pair of the Source Layer-2 ID and the Destination Layer-2 ID corresponding to a PC5-RRC connection which has been established by upper layers:

1> if the SL-CSI reporting has been triggered by a SCI and not cancelled:

2> if the sl-CSI-ReportTimer for the triggered SL-CSI reporting is not running

3> start the sl-CSI-ReportTimer.

2> if the sl-CSI-ReportTimer for the triggered SL-CSI reporting expires:

3> cancel the triggered SL-CSI reporting.

2> else if the MAC entity has SL resources allocated for new transmission and the SL-SCH resources can accommodate the SL-CSI reporting MAC CE and its subheader as a result of logical channel prioritization:

3> instruct the Multiplexing and Assembly procedure to generate a Sidelink CSI Reporting MAC CE as defined in clause 6.1.3.35;

3> stop the sl-CSI-ReportTimer for the triggered SL-CSI reporting;

3> cancel the triggered SL-CSI reporting.

2> else if the MAC entity has been configured with Sidelink resource allocation mode 1:

3> trigger a Scheduling Request.

5.22.2 SL-SCH Data Reception 5.22.2.1 SCI Reception

SCI indicate if there is a transmission on SL-SCH and provide the relevant HARQ information. A SCI consists of two parts: the $1^{st}$ stage SCI on PSCCH and the $2^{nd}$ stage SCI on PSSCH as specified in clause 8.1 of TS 38.214 [7].

The MAC entity shall:

1> for each PSCCH duration during which the MAC entity monitors PSCCH:

2> if a $1^{st}$ stage SCI has been received on the PSCCH:

3> determine the set of PSSCH durations in which reception of a $2^{nd}$ stage SCI and the transport block occur using the received part of the SCI;

3> if the $2^{nd}$ stage SCI for this PSSCH duration has been received on the PSSCH:

4> store the SCI as a valid SCI for the PSSCH durations corresponding to transmission(s) of the transport block and the associated HARQ information and QoS information;

1> for each PSSCH duration for which the MAC entity has a valid SCI:

2> deliver the SCI and the associated Sidelink transmission information to the Sidelink HARQ Entity.

5.22.2.2 Sidelink HARQ Operation 5.22.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is determined by the Sidelink identification information of the SCI. The Sidelink HARQ Entity directs Sidelink transmission information and associated TB s received on the SL-SCH to the corresponding Sidelink processes.

For each PSSCH duration, the Sidelink HARQ Entity shall:

1> for each SCI valid for this PSSCH duration:

2> if the NDI has been toggled compared to the value of the previous received transmission corresponding to the Sidelink identification information and the Sidelink process ID of the SCI or this is the very first received transmission for the pair of the Sidelink identification information and the Sidelink process ID of the SCI:
- 3> if there is a Sidelink process associated with the Sidelink identification information and the Sidelink process ID of the SCI:
  - 4> consider the Sidelink process as unoccupied;
  - 4> flush the soft buffer for the Sidelink process.
- 3> allocate the TB received from the physical layer and the associated Sidelink identification information and Sidelink process ID to an unoccupied Sidelink process;
- 3> associate the Sidelink process with the Sidelink identification information and the Sidelink process ID of this SCI and consider this transmission to be a new transmission.

[ . . . ]

6.1.3.35 Sidelink CSI Reporting MAC CE

The Sidelink CSI Reporting MAC CE is identified by a MAC subheader with LCID as specified in Table 6.2.4-1. The priority of the Sidelink CSI Reporting MAC CE is fixed to '1'. The Sidelink CSI Reporting MAC CE is defined as follows (FIG. 6.1.3.35-1):
RI: This field indicates the derived value of the Rank Indicator for sidelink CSI reporting as specified in clause 8.5 of TS 38.214 [7]. The length of the field is 1 bit;
CQI: This field indicates the derived value of the Channel Quality Indicator for sidelink CSI reporting as specified in clause 8.5 of TS 38.214 [7]. The length of the field is 4 bit;
R: Reserved bit, set to 0.

FIG. 6.1.3.35-1: Sidelink CSI Reporting MAC CE

6.1.3.36SP Positioning SRS Activation/Deactivation MAC CE

[ . . . ]

6.1.6 MAC PDU (SL-SCH)

A MAC PDU consists of one SL-SCH subheader and one or more MAC subPDUs. Each MAC subPDU consists of one of the following:
- A MAC subheader only (including padding);
- A MAC subheader and a MAC SDU;
- A MAC subheader and a MAC CE;
- A MAC subheader and padding.

The MAC SDUs are of variable sizes.
Each MAC subheader except SL-SCH subheader corresponds to either a MAC SDU, a MAC CE, or padding.
The SL-SCH subheader is of a fixed size and consists of the seven header fields V/R/R/R/SRC/DST.

FIG. 6.1.6-1: SL-SCH MAC Subheader

A MAC subheader except for fixed-sized MAC CE and padding consists of the four header fields R/F/LCID/L as depicted in FIG. 6.1.2-1 (with 8-bit L field) and FIG. 6.1.2-2 (with 16-bit L field). A MAC subheader for fixed-sized MAC CE and padding consists of the two header fields R/LCID as depicted in FIG. 6.1.2-3.
SL MAC subPDU(s) with MAC SDU(s) is placed after the SL-SCH subheader and before the MAC subPDU with a MAC CE and the MAC subPDU with padding in the MAC PDU as depicted in FIG. 6.1.6-2. SL MAC subPDU with a MAC CE is placed after all the MAC subPDUs with MAC SDU and before the MAC subPDU with padding in the MAC PDU as depicted in FIG. 6.1.6-2. The size of padding can be zero.

FIG. 6.1.6-2: Example of a SL MAC PDU

A maximum of one MAC PDU can be transmitted per TB per MAC entity.
A Work Item Description (WID) on NR sidelink enhancement is discussed in RP-202846, one or more parts of which are quoted below:

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

. . . .

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #89) [RAN1]

. . .

2. Resource allocation enhancement:
   Specify resource allocation to reduce power consumption of the UEs [RAN1, RAN2]
      Baseline is to introduce the principle of Rel-14 LTE sidelink random resource selection and partial sensing to Rel-16 NR sidelink resource allocation mode 2.
      Note: Taking Rel-14 as the baseline does not preclude introducing a new solution to reduce power consumption for the cases where the baseline cannot work properly.
      This work should consider the impact of sidelink DRX, if any.
   Study the feasibility and benefit of solution(s) on the enhancement(s) in mode 2 for enhanced reliability and reduced latency in consideration of both PRR and PIR defined in TR37.885 (by RAN #91), and specify the identified solution(s) if deemed feasible and beneficial [RAN1, RAN2]
   Inter-UE coordination with the following.
      A set of resources is determined at UE-A. This set is sent to UE-B in mode 2, and UE-B takes this into account in the resource selection for its own transmission.
      Note: The solution should be able to operate in-coverage, partial coverage, and out-of-coverage and to address consecutive packet loss in all coverage scenarios.

[ . . . ]

Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.
The solutions should cover both the operating scenario where the carrier(s) is/are dedicated to ITS and the operating scenario where the carrier(s) is/are licensed spectrum and also used for NR Uu/LTE Uu operation.

The solutions should support the network control of NR sidelink as in Rel-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

In RAN1 #106-e meeting associated with R1-2108692, RAN1 has some agreements about NR Vehicle-to-Everything (V2X). One or more parts of R1-2108692 are quoted below:

Agreement
 For scheme 1, the following inter-UE coordination information signalling from UE-A is supported. FFS details including condition(s)/scenario(s) under which each information is enabled to be sent by UE-A and used by UE-B.
  Set of resources preferred for UE-B's transmission
  Set of resources non-preferred for UE-B's transmission
Agreement
 In scheme 1, the following is supported for UE(s) to be UE-A(s)/UE-B(s) in the inter-UE coordination information transmission triggered by an explicit request in Mode 2:
  A UE that sends an explicit request for inter-UE coordination information can be UE-B
  A UE that received an explicit request from UE-B and sends inter-UE coordination information to the UE-B can be UE-A
  Working assumption At least a destination UE of a TB transmitted by UE-B can be UE A
  The above feature can be enabled or disabled or controlled by (pre-)configuration
 Working Assumption In scheme 1, the following is supported for UE(s) to be UE-A(s)/UE-B(s) in the inter-UE coordination information transmission triggered by a condition other than explicit request reception in Mode 2:
  A UE that satisfies the condition mentioned in the main bullet and sends inter-UE coordination information is UE-A
  A UE that received inter-UE coordination information from UE-A and uses it for resource (re-)selection is UE-B
  The above feature can be enabled or disabled or controlled by (pre-)configuration
Agreement
In scheme 1, at least following UE-B's behavior in its resource (re-)selection is supported when it receives inter-UE coordination information from UE-A:
 For preferred resource set, the following two options are supported:
  Option A): UE-B's resource(s) to be used for its transmission resource (re-)selection is based on both UE-B's sensing result (if available) and the received coordination information
   UE-B uses in its resource (re-)selection, resource(s) belonging to the preferred resource set in combination with its own sensing result
    UE-B uses in its resource (re-)selection, resource(s) not belonging to the preferred resource set when condition(s) are met
     FFS: Details of condition(s)
    This option is supported when UE-B performs sensing/resource exclusion
  Option B): UE-B's resource(s) to be used for its transmission resource (re-)selection is based only on the received coordination information
   UE-B uses in its resource (re-)selection, resource(s) belonging to the preferred resource set
    This option is supported at least when UE-B does not support sensing/resource exclusion
    FFS: Whether the support is conditional or UE capability
 For non-preferred resource set,
  UE-B's resource(s) to be used for its transmission resource (re-)selection is based on both UE-B's sensing result (if available) and the received coordination information
   UE-B excludes in its resource (re-)selection, resource(s) overlapping with the non-preferred resource set
    FFS: Details including
     Whether/how UE-B can use in its resource (re-)selection, resource(s) overlapping with the non-preferred resource set, definition of the overlap, and other details (if any)
     When UE-B excludes in its resource (re-)selection, resource(s) overlapping with the non-preferred resource set
    FFS: UE-B reselects in its resource (re-)selection, resource(s) to be used for its transmission when the resource(s) are fully/partially overlapping with the non-preferred resource set
Agreement
In scheme 1, at least the following is supported to determine inter-UE coordination information of preferred resource set:
 UE-A considers any resource(s) satisfying all the following condition(s) as set of resource(s) preferred for UE-B's transmission
  Condition 1-A-1:
   Resource(s) excluding those overlapping with reserved resource(s) of other UE identified by UE-A whose RSRP measurement is larger than a RSRP threshold
  FFS: Condition 1-A-2:
   Resource(s) excluding slot(s) where UE-A, when it is intended receiver of UE-B, does not expect to perform SL reception from UE-B
  FFS: Condition 1-A-3:
   Resource(s) satisfying UE-B's traffic requirement (if available)
Agreement
In scheme 1, at least the following is supported to determine inter-UE coordination information of non-preferred resource set:
 UE-A considers any resource(s) satisfying at least one of the following condition(s) as set of resource(s) non-preferred for UE-B's transmission
  Condition 1-B-1:
   Reserved resource(s) of other UE identified by UE-A from other UEs' SCI (including priority field) and RSRP measurement
   FFS: Other details (if any)
  FFS: Condition 1-B-2:
   Resource(s) (e.g., slot(s)) where UE-A, when it is intended receiver of UE-B, does not expect to perform SL reception from UE-B
   FFS: Other details (if any)

In RAN1 #106bis-e meeting associated with R1-2110751, RAN1 has some agreements about NR V2X. One or more parts of R1-2110751 are quoted below:
Working Assumption
 For Condition 1-B-1 of Scheme 1, the following two options are supported
  Option 1: Reserved resource(s) of other UE(s) identified by UE-A whose RSRP measurement is larger than a (pre)configured RSRP threshold which is determined by at least priority value indicated by SCI of the UE(s)

Option 2: Reserved resource(s) of other UE identified by UE-A whose RSRP measurement is smaller than a (pre)configured RSRP threshold which is determined by at least priority value indicated by SCI of the UE(s) when UE-A is a destination of a TB transmitted by the UE(s)

Working Assumption

For Scheme 1 with non-preferred resource set, support following condition:

Condition 1-B-2:

Resource(s) (e.g., slot(s)) where UE-A, when it is intended receiver of UE-B, does not expect to perform SL reception from UE-B due to half duplex operation Agreement For Condition 1-A-1 of Scheme 1, the set of resources preferred for UE-B's transmission is a form of candidate single-slot resource as specified in Rel-16 TS 38.214 Section 8.1.4

When the inter-UE coordination information transmission is triggered by UE-B's explicit request, the candidate single-slot resource(s) are determined in the same way according to Rel-16 TS 38.214 Section 8.1.4 with at least following parameters provided by signaling from UE-B. FFS whether or not to apply RSRP threshold increase in Step 7) of Rel-16 TS 38.214 Section 8.1.4.

Priority value to be used for PSCCH/PSSCH transmission

It replaces prio_TX

Number of sub-channels to be used for PSSCH/PSCCH transmission in a slot

It replaces L_subCH

Resource reservation interval

It replaces P_rsvp_TX

FFS: Starting/ending time location of resource selection window

Working Assumption

For Scheme 1 with preferred resource set, support following condition:

Condition 1-A-2:

Resource(s) excluding slot(s) where UE-A, when it is intended receiver of UE-B, does not expect to perform SL reception from UE-B due to half duplex operation This can be disabled by RRC (pre-)configuration In RAN1 #107-e meeting associated with Draft Report of 3GPP TSG RAN WG1 #107-e v0.1.0, RAN1 has some agreements about NR V2X. One or more parts of Draft Report of 3GPP TSG RAN WG1 #107-e v0.1.0 are quoted below:

Proposal

For Scheme 1,

MAC CE is used as the container of inter-UE coordination information transmission in case of non-preferred resource set.

For MAC CE

Option 1: N combinations of TRIV, FRIV, resource reservation period as specified in Rel-16 TS 38.214 Section 8.1.5 with following modification:

First resource location of each TRIV is separately indicated by the inter-UE coordination information For N<=3, SCI is used For N>3, MAC CE is used Option 3: When the resource set indicated by UE-A is a set of k candidate single-slot resources, the resource set is indicated by $$RIV = \sum_{j=1}^{k} \binom{r_j}{j} + \sum_{i=1}^{L_{subCH}-1} \binom{n_i}{k}$$

If $L_{subCH}$ is known by UE-B, the second sum term is omitted

For N<=3, SCI is used

For N>3, MAC CE is used

FFS: preferred resource set.

Agreement

For Condition 1-A-2 of Scheme 1, the set of resources preferred for UE-B's transmission is a form of candidate single-slot resource as specified in Rel-16 TS 38.214 Section 8.1.4

UE-A excludes candidate single-slot candidate(s) belonging to "slot(s) where UE-A, when it is intended receiver of UE-B, does not expect to perform SL reception from UE-B due to half duplex operation" after Step 6) of TS 38.214 Section 8.1.4

Agreement

For Scheme 1, a resource pool level (pre-)configuration can enable one of the following alternatives:

Alt 1 (Working Assumption): MAC CE or $2^{nd}$ SCI are used as the container of inter-UE coordination information transmission from UE A to UE B.

For the indication of resource set, the following is supported:

N combinations of TRIV, FRIV, resource reservation period as specified in Rel-16 TS 38.214 Section 8.1.5 with following modification. The value of resource reservation period is omitted at least when the transmission of preferred resource set is triggered by UE-B's explicit request.

First resource location of each TRIV is separately indicated by the inter-UE coordination information If [N<=3], MAC CE is used and it is up to UE implementation to additionally use $2^{nd}$ SCI. When $2^{ns}$ SCI and MAC CE are both used, the same resource set is indicated in the $2^{nd}$ SCI and the MAC CE. If [N>3], only MAC CE is used.

$2^{nd}$ SCI is UE RX optional

Alt 2: MAC CE is used as the container of inter-UE coordination information transmission from UE A to UE B.

For the indication of resource set, the following is supported:

N combinations of TRIV, FRIV, resource reservation period as specified in Rel-16 TS 38.214 Section 8.1.5 with following modification. The value of resource reservation period is omitted at least when the transmission of preferred resource set is triggered by UE-B's explicit request.

First resource location of each TRIV is separately indicated by the inter-UE coordination information FFS: Whether/How to use resource reservation information as coordination information Agreement For Scheme 1 with non-preferred resource set, Physical layer at UE-B excludes in its resource (re-)selection, candidate single-slot resource(s) obtained after Step 6) of Rel-16 TS 38.214 Section 8.1.4 overlapping with the non-preferred resource set Agreement For Condition 1-A-1 of Scheme 1, when UE-A determines the set of resources preferred for UE-B's transmission, apply RSRP threshold increase in the same way according to Rel-16 TS 38.214 Section 8.1.4.

FFS: Whether/how to introduce the maximum limit of RSRP threshold increase

Agreement

For Scheme 1, at least following parameters are provided by UE-B's request:
  Priority value to be used for PSCCH/PSSCH transmission
  Number of sub-channels to be used for PSSCH/PSCCH transmission in a slot
  Resource reservation interval Agreement For inter-UE coordination information triggered by an explicit request in Scheme 1,
  UE-A uses a TX resource pool used for UE-B's request transmission to determine the set of resources and to transmit the set of resources to UE-B Agreement For inter-UE coordination information triggered by a condition rather than request reception in Scheme 1,
  UE-A transmitting in a resource pool provides inter-UE coordination information associated with the same resource pool Sidelink mode 2 enhancement is discussed in R1-2110845, one or more parts of which are quoted below. Observation 3: Resource reservation interval, TX priority, Number of sub-channels, Start/end time of resource selection window are useful for coordination between UEs:
  For explicit request based procedure, UE-A receives these parameters from UE-B, and there's no need for UE-A to transmit such parameters back to UE-B
  For non-explicit request based procedure, UE-A transmits these parameters to UE-B to help UE-B to use the coordination resource(s)

. . . .

3.1.1.2 Contents of Explicit Request

As discussed in section 3.1.1.1.1, when the inter-UE coordination information transmission is triggered by UE-B's explicit request, the candidate single-slot resource(s) are determined in the same way according to Rel-16 TS 38.214 Section 8.1.4 with parameters of priority value to be used for PSCCH/PSSCH transmission, number of sub-channels to be used for PSSCH/PSCCH transmission in a slot, resource reservation interval, starting/ending time location of resource selection window provided by signaling from UE-B. These parameter need to be included in explicit request.

Besides, the identifiers to identify a UE transmitting/receiving the explicit request should also be included in the signaling to identify the role of UE-A or UE-B.

Proposal 4: For Scheme 1 Explicit Request Based Procedure, the Following Parameters are Included in the Request Signaling:
  Priority value to be used for PSCCH/PSSCH transmission
  Number of sub-channels to be used for PSSCH/PSCCH transmission in a slot
  Resource reservation interval
  Starting/ending time of resource selection window
  Identifiers to identify a UE transmitting/receiving this explicit request Sidelink mode 2 enhancement is discussed in R1-2111515, one or more parts of which are quoted below:

2 Inter-UE Coordination Scheme-1

2.1 Inter-UE Coordination Information and Signaling

The inter-UE coordination scheme 1 (sidelink conflict avoidance) can improve resource selection for sidelink transmission and reducing probability of various sidelink conflicts. The defined in Rel.16 sensing and resource selection procedure can be reused with some modifications discussed in this section. More specifically, the resource sets reported as a part of inter-UE coordination feedback can be generated following the principles of the sensing and resource selection procedure defined in clause 8.1.4 of [7](38.214).

[ . . . ]

2.9 Prioritization of Inter-UE Coordination Feedback Transmission

For inter-UE coordination scheme 1, the inter-UE coordination feedback can be associated with the sidelink transmission priority level. When feedback is multiplexed with sidelink data, the highest priority level among multiplexed components can be used. If a UE needs to multiplex multiple feedbacks, priority rules for feedback multiplexing can be introduced.

Proposal 13:
  For scheme 1,
    Inter-UE coordination feedback is associated with sidelink transmission priority level
      For request-based feedback, priority level for feedback is provided by transmitter requesting feedback signaling
      For condition-based feedback, priority level of sidelink feedback is either pre-configured or set to the highest priority level
    For sidelink transmission with multiplexed inter-UE coordination feedback, the priority level is set according to the highest priority among the multiplexed components (e.g., data and feedback priorities)

2.10 Pre-Processing of Inter-UE Coordination Feedback by TX UE

In this section, we discuss steps of inter-UE coordination feedback processing by TX UE for inter-UE coordination scheme 1. The described steps are not applicable for inter-UE coordination scheme 2.

2.10.1 Filtering of Inter-UE Coordination Feedbacks

In general, a UE may receive inter-UE coordination feedback from multiple UEs. The inter-UE coordination feedbacks may have different types request-based and condition-based feedback. Each feedback information is associated with feedback timestamp, that can be used to extract information on corresponding feedback resource selection window. The feedback can be also provided from UE having different SL-RSRP ranges and geographical locations. One of the first steps that needs to be done by UE is filtering of the available inter-UE coordination feedback information to determine which one is valid for current iteration of resource selection procedure. The filtering of inter-UE coordination feedback can be done at least based on the following feedback attributes:
  Feedback type (request- or condition-based, preferred- or non-preferred resource set)
    UE can sort and prioritize request-based feedback over condition-based and keep relevant resource sets separate
  Feedback source ID
    For each transmission a UE can use feedback source ID to determine whether feedback comes from target RX (TRX) or from non-target RX (nTRX). Priority in resource selection can be given to resources indicated by target RXs Feedback delay/aging time
UE can ignore/drop feedback with aging time which exceeds a pre-configured amount of time Overlap ratio of resource selection windows used for generation of feedback and TX sensing results
UE can ignore/drop feedback if TX resource selection window overlaps with feedback resource selection window on less that X % of slots/resources SL-RSRP measurement range (or pathloss range) or geographical distance range from UE providing inter-UE coordination feedback
UE can ignore/drop feedback if it is provided by UE outside of the pre-configured SL-RSRP/pathloss range or distance range Priority level used for feedback generation and feedback transmission
UE can ignore/drop feedback if it was generated for priority level higher that priority level used for transmission Proposal 14:
At least the following validity criteria can be pre-configured to determine whether UE can apply given inter-UE coordination feedback for resource selection
Feedback type (e.g., request- or condition-based, preferred or non-preferred resource sets)
Feedback source ID
Feedback aging time condition and overlap ratio with feedback resource selection window
Radio range or geographical distance from the source of inter-UE coordination feedback
Priority level used for generation of inter-UE coordination feedback 2.10.2 Format Translation of Inter-UE Coordination Feedback In general case, TX UE sensing results and inter-UE coordination feedback (that meet validity criteria) can be generated using different parameters. For instance, number of sub-channels used to form the candidate resource set by the TX UE and provided in inter-UE coordination feedback can be different. To simplify format translation, the inter-UE coordination feedback can be provided assuming a single sub-channel (or fixed pre-configured number of subchannels) for feedback generation. Other aspect that needs to be discussed is whether/how translation procedure should also consider resource reservation period and priority for feedback generation.

Proposal 15:
Construction of preferred and non-preferred resource set for inter-UE coordination feedback is based on the following assumptions
Single subchannel resource size (or pre-configured resource size)
Zero resource reservation period (or pre-configured reference resource reservation period)
Lowest priority value (or pre-configured priority value)
Resource sets from inter-UE coordination feedback are reformatted to align them with the resource set physical structure used by TX UE for resource selection.

Sidelink mode 2 enhancement is discussed in R1-2112127, one or more parts of which are quoted below:
2.1.4 Container of Preferred/Non-Preferred Resource Set
After UE-A decides to transmit coordination message, UE-A needs to prepare the transmission. For this behavior, container of the coordination message needs to be discussed and concluded. In scheme 1, shared information is a set of preferred or non-preferred resources. That is, the payload will be at least several bits, or more for finer information. In this case, possible options would be the following.
Option 1: SCI
Option 2: MAC CE
Option 3: RRC signaling
. . . .
Observation 1:
For inter-UE coordination scheme 1,
Payload size of IUC message would not be so small, thereby MAC-CE seems better than SCI.
Transmission via RRC signaling would lead to degradation of latency aspect.
Proposal 6:
In inter-UE coordination scheme 1, MAC-CE conveys a set of preferred/non-preferred resources.
2.1.5 Information Format of Preferred/Non-Preferred Resource Set
When UE-A transmits preferred/non-preferred resource set, the information format is still FFS. In our view, the overhead should sufficiently be reduced, and Rel-16 mechanism should be reused if possible. Therefore, we suggest to use TRIV/FRIV/reservation period as in Rel-16. One issue might be retransmissions of the IUC message. TRIV value becomes incorrect in the retransmission. To solve this issue, one reference time is indicated with the Rel-16 resource indication format.
Proposal 7:
For inter-UE coordination scheme 1, UE-A transmits a set of preferred/non-preferred resources as following format.
N combinations of TRW, FRIV, resource reservation period as specified in Rel-16 TS 38.214 Section 8.1.5, and first resource location of each TRW.

Sidelink mode 2 enhancement is discussed in R1-2112238, one or more parts of which are quoted below:
Observation 1: Non-preferred resource indication is less latency sensitive than preferred-resource indication but requires larger payloads.
Proposal 1: MAC-CE is used for indicating the non-preferred resource set to accommodate the needed payload size.
Next, we discuss whether the MAC-CE should be standalone or multiplexed with other SL-SCH. Each option is well suited for some scenario. However, there is one issue, and it is that simultaneous transmissions in the same slot, and on the same carrier, are not supported by the UE in sidelink or Uu. Therefore, we propose that the MAC-CE carrying the non-preferred resource indication is either multiplexed with other SL-SCH when available or transmitted in a slot without other sidelink transmissions.
Proposal 2: The MAC-CE containing the set of non-preferred resources is either multiplexed with other SL-SCH when available or transmitted in a slot without other sidelink transmissions.
When a MAC-CE containing non-preferred resources is not multiplexed with other SL-SCH, transmission characteristic of the PSSCH transmission carrying MAC-CE need to be defined, in particular:
a) Number of subchannels: this should be 1 to minimize IUC resource consumption footprint.
b) Remaining PDB, or T2: this should be small enough to give UE-B enough response time, but also should be large enough to make sure that 3 dB boosting of RSRP thresholds is not triggered. If 3 dB boosting of RSRP thresholds is triggered, collisions with other normal PSSCH transmissions can happen. Note that this is a problem only when a dedicated set of resources for sending IUC is not supported. One possible solution if dedicated resources are not configured, is to let the UE start with a small T2 and then increase T2 if there are not sufficient resources instead of boosting 3 dB.

c) Packet priority: this should be 8, the largest numerical priority value. This ensures that UE-A always uses the lowest RSRP threshold and avoids unnecessary collisions with normal PSSCH transmissions.

d) Number of retransmissions: this should be 1 to minimize IUC resource consumption footprint.

Proposal 3 When the MAC-CE containing non-preferred resources is not multiplexed with other SL-SCH Number of subchannels: 1

Remaining PDB, or T2: increase T2 whenever there is not sufficient resource in resource selection window.

Packet priority: 8

Number of retransmissions: 1

For NR Release 16 (NR Rel-16) sidelink (SL) transmission, there are at least two sidelink resource allocation modes defined for NR Vehicle-to-Everything (NR-V2X) sidelink communication such as discussed in a 3rd Generation Partnership Project (3GPP) 3GPP Technical Specification (TS) (3GPP TS 38.214 V16.7.0): (i) in mode 1 (e.g., NR sidelink resource allocation mode 1), a base station (e.g., a network node) can schedule one or more sidelink transmission resources to be used by a transmitter User Equipment (UE) (TX UE) for one or more sidelink transmissions, and/or (ii) in mode 2 (e.g., NR sidelink resource allocation mode 2), a TX UE determines (e.g., a base station does not schedule) one or more sidelink transmission resources within a sidelink resource pool, wherein the sidelink resource pool is configured by a base station (e.g., network node) and/or is pre-configured.

For network scheduling mode (e.g., NR sidelink resource allocation mode 1), the network node may transmit a sidelink grant on Uu interface for scheduling resources of Physical Sidelink Control Channel (PSCCH) and/or Physical Sidelink Shared Channel (PSSCH). In response to receiving the sidelink grant, the TX UE may perform PSCCH transmissions and/or PSSCH transmissions on PC5 interface. The Uu interface corresponds to a wireless interface for communication between network and the TX UE. The PC5 interface corresponds to a wireless interface for communication between (e.g., directly between) UEs and/or devices.

For UE selection mode (e.g., NR sidelink resource allocation mode 2), since transmission resources are not scheduled by a network, the TX UE may be required to perform sensing before selecting a resource for transmission (e.g., the TX UE may perform sensing-based transmission) in order to avoid resource collision and interference with (e.g., from or to) other UEs. When sensing-based resource selection is triggered (and/or requested) for a data packet, the UE can determine a valid/identified resource set based on sensing results (e.g., the valid/identified resource set may be a resource set that is identified by the UE and/or determined to be valid by the UE). The valid/identified resource set may be reported to higher layers (e.g., higher layers of the TX UE, such as Medium Access Control (MAC) layer of the TX UE). The TX UE (e.g., the higher layers of the TX UE) may select (e.g., randomly select) one or more valid/identified resources from the valid/identified resource set. The TX UE may utilize the one or more valid/identified resources to perform one or more sidelink transmissions for transmitting the data packet. The one or more sidelink transmissions from the TX UE may comprise PSCCH transmission and/or PSSCH transmission.

In NR Rel-16 sidelink, full sensing is supported for sensing-based resource selection. To reduce power consumption, partial sensing is designed in NR Rel-17 sidelink, such that a UE may perform periodic-based partial sensing and/or contiguous partial sensing for selecting sidelink resources, instead of performing full sensing with more power consumption. Note that the partial sensing and resource selection may be performed from transmitter aspect of the UE.

In NR Rel-16 sidelink, a sidelink control information (SCI) can indicate/allocate/schedule at most three sidelink resources (e.g., PSSCH resources) for a first Transport Block (TB) (e.g., the same TB), e.g., via Frequency resource assignment field and Time resource assignment field in the SCI. In the present disclosure, the term "indicate/allocate/schedule" may refer to indicate, allocate and/or schedule. A first PSSCH resource (e.g., one PSSCH resource and/or an initial PSSCH resource) of the at most three PSSCH resources and the SCI are in the same sidelink slot. The SCI may comprise a first-stage SCI (e.g., SCI format 1-A) and a second-stage SCI (e.g., SCI format 2-A or SCI format 2-B). The first-stage SCI may be transmitted via PSCCH. The second-stage SCI may be transmitted via multiplexing the second-stage SCI with the indicated/allocated/scheduled PSSCH in the same sidelink slot. In other words, in NR Rel-16 sidelink, the SCI can indicate/allocate/schedule at most two PSSCH resources, for the first TB, in later sidelink slots (e.g., sidelink slots after the sidelink slot in which the SCI is transmitted with the PSSCH resource).

Alternatively and/or additionally, in a sidelink resource pool, whether resource reservation by a SCI for another TB is enabled, is not enabled or is not configured, may be configured (e.g., whether the resource reservation is enabled, not enabled or not configured for the sidelink resource pool may be pre-configured for the sidelink resource pool). When a sidelink resource pool is configured (e.g., pre-configured) with enablement of such resource reservation (e.g., when the resource reservation is enabled for the sidelink resource pool), the sidelink resource pool is configured with a set of reservation period values. In an example, the set of reservation period values (e.g., a set of one or more reservation period values) may comprise 0 milliseconds, 1:99 milliseconds (e.g., a value in the range of at least 1 millisecond to at most 99 milliseconds, 100 milliseconds, 200 milliseconds, 300 milliseconds, 400 milliseconds, 500 milliseconds, 600 milliseconds, 700 milliseconds, 800 milliseconds, 900 milliseconds, and/or 1000 milliseconds. In some examples, a resource reservation period field in a SCI in the sidelink resource pool may indicate one or more reservation period values for one or more resource reservations (e.g., the resource reservation period field may be indicative of which reservation period value to use for a future resource reservation). In some examples, a size of the set of reservation period values (e.g., a number of values of the set of reservation period values) may be from 1 to 16 (e.g., the set of reservation period values may comprise at most 16 reservation period values).

In NR Rel-16 sidelink, a sidelink Channel State Information (CSI) report (from a device to a device, for example) may be transmitted via a MAC Control Element (CE) (e.g., a SL-CSI reporting MAC CE). UE-B may request a SL CSI report via a CSI request field (e.g., a 1-bit CSI request field) in a SCI format 2-A. When UE-A receives the SCI format 2-A (from UE-B, for example), UE-A may generate a SL CSI report and/or generate a corresponding SL-CSI reporting MAC CE (e.g., the SL-CSI reporting MAC CE may comprise the SL CSI report). The SL-CSI reporting MAC CE may be included in a MAC Protocol Data Unit (PDU), and UE-A may transmit the MAC PDU (e.g., transmit a TB) via PSSCH to UE-B (e.g., the MAC PDU may be packaged as the TB). In some systems, SL CSI report is supported for unicast, and not supported for groupcast and broadcast. Alternatively and/or additionally, SL CSI reporting may be supported for groupcast and/or broadcast.

Priority of the MAC PDU may be set to the value (e.g., priority value) of the highest priority of one or more logical channels (if any), and the MAC CE (e.g., the SL-CSI reporting MAC CE), if included, in the MAC PDU. A priority field in a corresponding SCI (e.g., in SCI format 1-A) may indicate a priority value for the MAC PDU (e.g., which indicates the priority of the MAC PDU). A smaller priority value (in the priority field, for example) may correspond to (e.g., may indicate) a higher priority (e.g., priority value 1 indicates highest priority, while priority value 8 indicates lowest priority). Alternatively and/or additionally, the priority value of the SL-CSI reporting MAC CE may be fixed to '1'.

For enhancing reliability and/or reducing latency in mode 2 (e.g., NR sidelink resource allocation mode 2), inter-UE coordination is studied. With inter-UE coordination, a UE-A may determine a set of resources and send the set of resources to UE-B, and UE-B takes the set of resources into account in resource selection for its own transmission. In accordance with one or more standards and/or specifications, and/or one or more agreements in RAN1 (such as agreements provided in R1-2108692, R1-2110751 and/or Draft Report of 3GPP TSG RAN WG1 #107-e v0.1.0), there may be at least two types of the set of resources in scheme 1 (e.g., inter-UE coordination scheme 1).

A first type (of the at least two types) of the set of resources may be a set of resources preferred for UE-B's transmission (e.g., White resource set). In the first type, UE-A excludes one or more resources overlapping with one or more reserved resources of one or more other UEs identified by UE-A whose Reference Signal Received Power (RSRP) measurement is larger than a RSRP threshold (e.g., Condition 1-A-1 of scheme 1). Based on UE-A's sensing result, UE-A can identify candidate resources that are (i) not reserved by other UEs and/or (ii) with lower interference (e.g., lower interference relative to other resources other than the candidate resources). UE-A may include the identified sidelink resources in the set of resources. When UE-A is an intended receiver of UE-B, UE-A may exclude (e.g., exclude from the set of resources) slots in which UE-A does not expect to perform SL reception from UE-B (e.g., Condition 1-A-2 of scheme 1). Accordingly, if UE-B does not perform sensing, UE-B may select sidelink resources (to use for sidelink transmission by UE-B, for example) directly from the set of resources (e.g., Option B of scheme 1). If UE-B performs sensing, UE-B can select sidelink resources (to use for sidelink transmission by UE-B, for example) based on the set of resources and UE-B's sensing result determined via the sensing (e.g., Option A of scheme 1).

A second type (of the at least two types) of the set of resources may be a set of resources non-preferred for UE-B's transmission (e.g., Black resource set). In the second type, UE-A identifies sidelink resources that are (i) reserved by other UEs and/or (ii) with higher interference (e.g., higher interference relative to other resources other than the identified sidelink resources). UE-A may include the identified sidelink resources in the set of resources (e.g., Condition 1-B-1 of scheme 1). When UE-A is an intended receiver of UE-B, UE-A may include (e.g., include in the set of resources) one or more sidelink resources in one or more slots in which UE-A does not expect to perform SL reception from UE-B (e.g., Condition 1-B-2 of scheme 1). In some examples, since UE-A cannot perform transmission and reception concurrently (e.g., simultaneously), it is not preferred for UE-B to perform sidelink transmission to UE-A using the one or more sidelink resources in the one or more slots. Accordingly, UE-B can exclude the set of resource from its resource selection. For example, a physical layer of UE-B may exclude candidate single-slot resources (e.g., candidate single-slot resources obtained after step 6 of Rel-16 TS 38.214 section 8.1.4) overlapping with the set of resources (e.g., the non-preferred resource set).

In some systems, request-based inter-UE coordination information is supported. UE-B can send a request (e.g., an explicit request) for inter-UE coordination information to UE-A (e.g., UE-B may send the request when UE-B has data arrival and/or has inadequate sensing results and/or no sensing results). The request may provide a priority value to be used for a sidelink transmission (e.g., PSCCH/PSSCH transmission) by UE-B, a number of sub-channels to be used for the sidelink transmission in a slot, and/or a resource reservation interval (such as discussed in Draft Report of 3GPP TSG RAN WG1 #107-e v0.1.0). In the present disclosure, the term "PSCCH/PSSCH transmission" may refer to a PSCCH transmission and/or a PSSCH transmission. When UE-A receives the request from UE-B, UE-A may generate inter-UE coordination information (e.g., information indicative of a set of resources), and may send the inter-UE coordination information to UE-B. In some examples, UE-A may perform sensing and determine the set of resources based on a sensing result of the sensing. As agreed in RAN1 #107 meeting (associated with Draft Report of 3GPP TSG RAN WG1 #107-e v0.1.0), the inter-UE coordination information may be transmitted (e.g., sent) via a MAC CE, and may be transmitted via a second-stage SCI (e.g., in addition to being transmitted via the MAC CE). In some examples, UE-A may be a destination UE of a TB transmitted by UE-B.

In some systems, condition-triggered inter-UE information may be supported. When UE-A detects and/or determines a condition is satisfied, UE-A may generate inter-UE coordination information (e.g., information indicative of a set of resources), and may send the inter-UE coordination information to UE-B. As agreed in RAN1 #107 meeting (associated with Draft Report of 3GPP TSG RAN WG1 #107-e v0.1.0), the inter-UE coordination information may be transmitted (e.g., sent) via a MAC CE, and may be transmitted via a second-stage SCI (e.g., in addition to being transmitted via the MAC CE). In some examples, UE-A may be a destination UE of a TB transmitted by UE-B.

In some systems, a container of request for inter-UE coordination information is not yet defined. Either MAC CE or SCI (e.g., second-stage SCI) (and/or a combination of both the MAC CE and the SCI) may be used as the container of the request for inter-UE coordination information). The container of the request for inter-UE coordination information may provide a priority value to be used for a PSCCH/PSSCH transmission by UE-B, a number of sub-channels to be used for the PSCCH/PSSCH transmission in a slot, and/or a resource reservation interval (e.g., the container of the request may provide other information in addition to the priority value, the number of sub-channels and/or the resource reservation interval). In some systems, there is an issue in which a UE may be unable to set a priority for a request for inter-UE coordination information, which may prevent the request and/or the PSCCH/PSSCH transmission from being processed in a timely and/or efficient manner. Thus, the present disclosure provides one or more concepts, mechanisms, methods and/or embodiments that enable the UE to set the priority for the request and/or solve the issue.

Concept A

In Concept A, a first UE may generate a first MAC CE, wherein the first MAC CE is included (e.g., multiplexed) in a MAC PDU. The first UE transmits the MAC PDU via PSSCH transmission to one or more UEs comprising a second UE. The first UE transmits a SCI to one or more UEs comprising the second UE, wherein the SCI schedules the PSSCH transmission for transmitting the MAC PDU (e.g., the SCI may allocate one or more PSSCH resources for the PSSCH transmission comprising transmission of the MAC PDU). In some examples, the SCI is transmitted in the same Transmission Time Interval (TTI)/slot with the PSSCH transmission (e.g., the SCI is transmitted in the same TTI/slot that comprises the one or more PSSCH resources for the PSSCH transmission). In the present disclosure, the term "TTI/slot" may refer to a TTI and/or a slot.

In some examples, the first MAC CE may be utilized for transmitting a request (e.g., a request for inter-UE coordination information/message). In an example in which the first MAC CE comprises the request, the first UE may be UE-B (discussed in the present disclosure), and/or the second UE may be UE-A (discussed in the present disclosure). In some examples, the SCI may be associated with (e.g., may indicate) unicast or groupcast, and/or the PSSCH transmission may be unicast transmission or groupcast transmission. In some examples, a first priority value (e.g., the first priority value may be a priority value for the first MAC CE) may be a defined priority value (e.g., a fixed, specified, configured and/or pre-configured priority value). For example, the first priority value may be defined as 1 or other value (e.g., the first priority value may be fixed to 1 or the other value, and/or may be specified, configured and/or pre-configured as 1 or the other value). Alternatively and/or additionally, the first priority value may be the same as a priority value included in the request.

Alternatively and/or additionally, in some examples, the first MAC CE may be utilized for transmitting an information/report (e.g., an inter-UE coordination information/message). In the present disclosure, the term "inter-UE coordination information/message" may refer to information and/or a message (e.g., a message comprising the information) for inter-UE coordination (e.g., coordination between UEs). In the present disclosure, the term "information/report" may refer to information and/or a report (e.g., a reports comprising the information). In an example in which the first MAC CE comprises the information/report (e.g., the inter-UE coordination information/message), the first UE may be UE-A (discussed in the present disclosure), and/or the second UE may be UE-B (discussed in the present disclosure). In some examples, the SCI may be associated with (e.g., may indicate) unicast, groupcast or broadcast, and/or the PSSCH transmission may be unicast transmission, groupcast transmission or broadcast transmission. In some examples, the first priority value may be a defined priority value (e.g., a fixed, specified, configured and/or pre-configured priority value). For example, the first priority value may be defined as 1 or other value (e.g., the first priority value may be fixed to 1 or the other value, and/or may be specified, configured and/or pre-configured as 1 or the other value). Alternatively and/or additionally, the first priority value may be the same as a priority value included in the inter-UE coordination information/message.

In some examples, a priority threshold (e.g., a maximum or minimum usable priority value for sidelink) may be defined (e.g., a fixed, specified, configured and/or pre-configured).

In some examples, in response to (and/or after and/or when) (i) the first UE transmitting the SCI with a field indicating SL Hybrid Automatic Repeat Request (HARQ) feedback enabled (e.g., the field may indicate that SL HARQ feedback is enabled), and/or (ii) the first UE performing the PSSCH transmission (for transmitting the MAC PDU, for example) to one or more UEs comprising the second UE, the first UE may monitor/receive/detect one or more Physical Sidelink Feedback Channel (PSFCH) resources associated with the SCI and/or the PSSCH transmission. In the present disclosure, the term "monitor/receive/detect" may refer to monitor, receive and/or detect.

In some examples, in response to (and/or after and/or when) (i) the second UE receiving the SCI with the field indicating SL HARQ feedback enabled and/or (ii) the second UE receiving the PSSCH transmission from the first UE, the second UE may transmit PSFCH transmission on the one or more PSFCH resources associated with the SCI and/or the PSSCH transmission.

In some examples, the one or more PSFCH resources and/or the PSFCH transmission may be utilized for transmitting SL HARQ feedback (e.g., Acknowledgement (ACK) or Negative Acknowledgement (NACK)).

In some examples, the field of the SCI may be set to indicate SL HARQ feedback enabled (e.g., the first UE may enable SL HARQ feedback for the SCI and/or the PSSCH transmission) based on the MAC PDU comprising the first MAC CE (e.g., based on the MAC PDU comprising the inter-UE coordination information/message).

Alternatively and/or additionally, Concept A may allow the MAC PDU to comprise a second MAC CE (in addition to the first MAC CE, for example) for the second UE (e.g., the first UE may provide the second UE with the first MAC CE and the second MAC CE via transmission of the MAC PDU).

The second MAC CE may be a SL CSI reporting MAC CE. Alternatively and/or additionally, the second MAC CE may be a SL Discontinuous Reception (DRX) command MAC CE. When the second UE receives the SL DRX command MAC CE, the second UE may stop an inactivity timer for a sidelink (e.g., a PC5 link associated with the first UE and the second UE). In some examples, when the first UE transmits a second MAC PDU comprising the second MAC CE (e.g., the second MAC PDU may only comprise the second MAC CE and/or may not comprise the first MAC CE), the first UE may set a field of a corresponding SCI (e.g., a SCI that is different than the SCI and/or that is used for providing information associated with the second MAC PDU comprising the second MAC CE) to indicate disabled SL HARQ feedback (e.g., the field may indicate that SL HARQ feedback is disabled).

In some examples, the first UE has sidelink data available to be transmitted to the second UE, wherein the sidelink data is associated with one or more logical channels. In some examples, the one or more logical channels comprise a first logical channel. In some examples, the one or more logical channels comprise a second logical channel. In some examples, the first logical channel is associated with (e.g., set to) enabled SL HARQ feedback (e.g., SL HARQ feedback is enabled for the first logical channel). In some examples, the second logical channel is associated (e.g., set to) disabled SL HARQ feedback (e.g., SL HARQ feedback is disabled for the second logical channel). In some examples, when the first UE generates the MAC PDU comprising sidelink data from the first logical channel, the first UE may include (e.g., multiplex) the first MAC CE and the second MAC CE in the MAC PDU, and/or the first UE may set (in a field in a SCI associated with the MAC PDU, for example) enabled SL HARQ feedback (e.g., the UE may enable SL HARQ feedback associated with the SCI and/or the MAC PDU based on the enabled SL HARQ feedback of the first logical channel). In some examples, when the first UE generates the MAC PDU comprising sidelink data from the second logical channel, the first UE may include (e.g., multiplex) the first MAC CE and the second MAC CE in the MAC PDU, and/or the first UE may set (in a field in a SCI associated with the MAC PDU, for example) disabled SL HARQ feedback (e.g., the UE may disable SL HARQ feedback associated with the SCI and/or the MAC PDU based on the disabled SL HARQ feedback of the second logical channel). Alternatively and/or additionally, when the first UE generates the MAC PDU comprising sidelink data from the second logical channel, the first UE may include (e.g., multiplex) the first MAC CE and the second MAC CE in the MAC PDU, and/or the UE may set (in a field in a SCI associated with the MAC PDU, for example) enabled SL HARQ feedback (e.g., the UE may enable SL HARQ feedback associated with the SCI and/or the MAC PDU based on the enabled SL HARQ feedback of the first MAC CE).

In some examples, the UE is not allowed to multiplex sidelink data from the first logical channel and sidelink data from the second logical channel into the same MAC PDU.

In some examples, when the MAC PDU comprises sidelink data and MAC CEs, (e.g., the first MAC CE, the second MAC CE and/or one or more other second MAC CEs in addition to the first MAC CE and the second MAC CE), the first UE: (i) may set disabled SL HARQ feedback (based on the second logical channel, for example), if (and/or when) the MAC PDU comprises sidelink data from the second logical channel, (ii) may set enabled SL HARQ feedback (based on the first logical channel, for example), if (and/or when) the MAC PDU comprises sidelink data from the first logical channel, (iii) may set enabled or disabled SL HARQ feedback based on a highest priority among priorities of the first MAC CE, the second MAC CE and the one or more logical channels associated with the sidelink data (e.g., the first UE may set enabled SL HARQ feedback if SL HARQ feedback is enabled for the logical channel or the MAC CE associated with the highest priority, or the first UE may set disabled SL HARQ feedback if SL HARQ feedback is disabled for the logical channel or the MAC CE associated with the highest priority), or (iv) may set enabled SL HARQ feedback if (and/or when) at least one MAC CE or logical channel, among the first MAC CE, the second MAC CE and the one or more logical channels associated with the sidelink data, is associated with enabled SL HARQ feedback.

In the present disclosure, in some examples, when the first UE sets enabled SL HARQ feedback, the first UE (i) may enable SL HARQ feedback for a SCI associated with the MAC PDU and/or for the MAC PDU, and/or (ii) may set a field in the SCI to indicate that SL HARQ feedback is enabled for the SCI and/or the MAC PDU.

In the present disclosure, in some examples, when the first UE sets disabled SL HARQ feedback, the first UE (i) may disable SL HARQ feedback for a SCI associated with the MAC PDU and/or for the MAC PDU, and/or (ii) may set a field in the SCI to indicate that SL HARQ feedback is disabled for the SCI and/or the MAC PDU.

In some examples, the first MAC CE may have a higher priority than the second MAC CE when multiplexing in a MAC PDU. In some examples, a priority value associated with the first MAC CE is smaller than a priority value associated with the second MAC CE (e.g., the first MAC CE may have a higher priority than the second MAC CE when multiplexing in a MAC PDU based on the priority value associated with the first MAC CE being smaller than the priority value associated with the second MAC CE). Alternatively and/or additionally, the first MAC CE may have a higher priority than the second MAC CE when multiplexing in a MAC PDU (e.g., the UE may prioritize the first MAC CE over the second MAC CE), without consideration and/or comparison of priority values associated with the first MAC CE and the second MAC CE. For example, when generating a MAC PDU, the UE may prioritize the first MAC CE (e.g., inter-coordination MAC CE that may comprise the inter-UE coordination information/message) over the second MAC CE (e.g., DRX command MAC CE or SL CSI reporting MAC CE). Alternatively and/or additionally, one or more logical channels and one or more MAC CEs may be prioritized in the following order when multiplexing in a MAC PDU: data from Sidelink Control Channel (SCCH) may be prioritized over the first MAC CE (e.g., an inter-coordination MAC CE that may comprise an inter-UE coordination information/message), which may be prioritized over the second MAC CE (e.g., a Sidelink DRX command MAC CE), which may be prioritized over data from a Sidelink Traffic Channel (STCH) (e.g., data from any STCH).

In some examples, the second MAC CE may have a higher priority than the first MAC CE when multiplexing in a MAC PDU. In some examples, a priority value associated with the second MAC CE is smaller than a priority value associated with the first MAC CE (e.g., the second MAC CE may have a higher priority than the first MAC CE when multiplexing in a MAC PDU based on the priority value associated with the second MAC CE being smaller than the priority value associated with the first MAC CE). Alternatively and/or additionally, the second MAC CE may have a higher priority than the first MAC CE when multiplexing in a MAC PDU (e.g., the UE may prioritize the second MAC CE over the first MAC CE), without consideration and/or comparison of priority values associated with the first MAC CE and the second MAC CE. For example, when generating a MAC PDU, the UE may prioritize the second MAC CE (e.g., DRX command MAC CE or SL CSI reporting MAC CE) over the first MAC CE (e.g., inter-coordination MAC CE that may comprise the inter-UE coordination information/message). Alternatively and/or additionally, one or more logical channels and one or more MAC CEs may be prioritized in the following order when multiplexing in a MAC PDU: data from SCCH may be prioritized over the second MAC CE (e.g., a Sidelink CSI Reporting MAC CE), which may be prioritized over the first MAC CE (e.g., an inter-coordination MAC CE that may comprise an inter-UE coordination information/message), which may be prioritized over data from a STCH (e.g., data from any STCH).

In some examples, MAC CEs and/or sidelink data may be included (e.g., multiplexed) in a MAC PDU according to an order in which the MAC CEs and/or the sidelink data (and/or one or more logical channels associated with the sidelink data) are prioritized for multiplexing in the MAC PDU.

Concept B

In Concept B, a first UE may transmit a first SCI to one or more UEs comprising a second UE, wherein the first SCI schedules a first PSSCH transmission for transmitting a MAC PDU (e.g., the first SCI may allocate at least one first PSSCH resource for the first PSSCH transmission comprising transmission of the MAC PDU). The first UE may transmit a message (in addition to transmitting the first SCI and/or the MAC PDU, for example), wherein the message is included (e.g., multiplexed) in the first SCI. In some examples, the MAC PDU may be associated with a third priority value. In some examples, the message may be associated with a fourth priority value.

In some examples, the first SCI may comprise a first first-stage SCI and a first second-stage SCI (and/or may comprise additional information in addition to the first first-stage SCI and the first second-stage SCI). In some examples, the first UE transmits the first first-stage SCI and the first second-stage SCI to one or more UEs comprising the second UE, wherein the first first-stage SCI and the first second-stage SCI schedule the first PSSCH transmission for transmitting the MAC PDU (e.g., the first first-stage SCI and the first second-stage SCI may allocate the at least one first PSSCH resource for the first PSSCH transmission comprising transmission of the MAC PDU). The first UE may transmit the message (in addition to transmitting the first first-stage SCI, the first second-stage SCI and the MAC PDU, for example), wherein the message is included (e.g., multiplexed) in the first second-stage SCI.

In a first embodiment of Concept B, a priority field in the first first-stage SCI may indicate a smaller value among the third priority value and the fourth priority value. For example, a value of the priority field may be set to the smaller value of the two priority values. In some examples, if (and/or when) the third priority value is smaller than the fourth priority value, the priority field in the first first-stage SCI may indicate the third priority value (e.g., the value of the priority field may be set to the third priority value). If (and/or when) the fourth priority value is smaller than the third priority value, the priority field in the first first-stage SCI may indicate the fourth priority value (e.g., the value of the priority field may be set to the fourth priority value).

In a second embodiment of Concept B, a priority field in the first first-stage SCI may indicate the third priority value. In some examples, if (and/or when) the third priority value is smaller than the fourth priority value, the priority field in the first first-stage SCI may indicate the third priority value (e.g., the value of the priority field may be set to the third priority value). If (and/or when) the fourth priority value is smaller than the third priority value, the priority field in the first first-stage SCI may indicate the third priority value (e.g., the value of the priority field may be set to the third priority value).

In a third embodiment of Concept B, a priority field in the first first-stage SCI may indicate the fourth priority value. In some examples, if (and/or when) the third priority value is smaller than the fourth priority value, the priority field in the first first-stage SCI may indicate the fourth priority value (e.g., the value of the priority field may be set to the fourth priority value). If (and/or when) the fourth priority value is smaller than the third priority value, the priority field in the first first-stage SCI may indicate the fourth priority value (e.g., the value of the priority field may be set to the fourth priority value).

In some examples, the MAC PDU comprises a MAC CE and/or sidelink data from one or more logical channels. In some examples, a highest priority among the MAC CE and the one or more logical channels is associated with the third priority value. In some examples, the smallest priority value among a priority value of MAC CE and one or more priority values of the one or more logical channels is the third priority value.

In some examples, the fourth priority value may be defined (e.g., fixed, specified, configured and/or pre-configured) for the message.

Alternatively and/or additionally, the message may indicate/provide/comprise the fourth priority value (and/or information associated with the fourth priority value). In the present disclosure, the term "indicate/provide/comprise" may refer to indicate, provide and/or comprise.

In some examples, the message may be a request (e.g., a request for inter-UE coordination information/message). In some examples, the first UE may be the UE-B (discussed in the present disclosure), and/or the second UE may be UE-A (discussed in the present disclosure). In some examples, the first SCI may be associated with (e.g., may indicate) unicast or groupcast, and/or the first PSSCH transmission may be unicast transmission or groupcast transmission. In some examples, the message may indicate/provide/comprise the fourth priority value, a second number of sub-channels, and a second resource reservation interval (and/or the message may indicate/provide/comprise additional information in addition to the fourth priority value, the second number of sub-channels, and the second resource reservation interval). In some examples, the fourth priority value, the second number of sub-channels, and the second resource reservation interval are utilized by the second UE for generating an inter-UE coordination information/message.

In some examples, the first first-stage SCI may indicate/provide/comprise a first number of sub-channels and a first resource reservation interval (and/or the first first-stage SCI may indicate/provide/comprise additional information in addition to the first number of sub-channels and the first resource reservation interval). In some examples, the first number of sub-channels and the second resource reservation interval are utilized for scheduling and/or allocating the first PSSCH transmission (transmitted from the first UE) and/or the at least one first PSSCH resource (utilized by the first UE).

In some examples, the first UE may transmit a second SCI to one or more UEs comprising the second UE, wherein the second SCI schedules a second PSSCH transmission for transmitting the (same) MAC PDU (e.g., the second SCI may allocate at least one second PSSCH resource for the second PSSCH transmission comprising transmission of the same MAC PDU for which the at least one first PSSCH resource is allocated). In some examples, the first UE may not transmit the message in the second SCI. For example, the message may not be included (and/or may not be multiplexed) in the second SCI.

In some examples, the second SCI may comprise a second first-stage SCI and a second second-stage SCI (and/or may comprise additional information in addition to the second first-stage SCI and the second second-stage SCI). In some examples, a priority field in the second first-stage SCI may indicate the third priority value (and/or may not indicate the fourth priority value). For example, a value of the priority field in the second first-stage SCI may be set to the third priority value (and/or may not be set to the fourth priority value).

In some examples, the first SCI is transmitted in the same TTI/slot with the first PSSCH transmission (e.g., the first SCI is transmitted in the same TTI/slot that comprises the first PSSCH resource for the first PSSCH transmission). The second SCI is transmitted in the same TTI/slot with the second PSSCH transmission (e.g., the second SCI is transmitted in the same TTI/slot that comprises the second PSSCH resource for the second PSSCH transmission). In some examples, the first SCI may schedule the second PSSCH transmission in addition to scheduling the first PSSCH transmission (e.g., the first SCI may allocate the second PSSCH resource for the second PSSCH transmission in addition to allocating the first PSSCH resource for the first PSSCH transmission).

In some examples, the first UE may transmit the second SCI after the first SCI (e.g., the second SCI is transmitted after the first SCI).

In some examples, the first UE may transmit the second PSSCH transmission after the first PSSCH transmission (e.g., the second PSSCH transmission is transmitted after the first PSSCH transmission).

In some examples, if (and/or when) (i) the second UE detects and/or receives more than one SCI (e.g., the first SCI and the second SCI) comprising a message (e.g., a message comprising a request for inter-UE coordination information/message), and (ii) the more than one SCI are associated with (e.g., are for) the same MAC PDU and/or the same TB, the second UE may consider (and/or expect) the message to be the same in each SCI of the more than one SCI (e.g., the second UE may consider fields and/or content in the message to be the same in each SCI of the more than one SCI). In some examples, when the message comprises a request (e.g., a request for inter-UE coordination information/message), the second UE may consider to be requested once (even though the second UE detects and/or receives the more than one SCI which may each comprise the request). For example, the second UE may generate one information/report (e.g., one inter-UE coordination information/message) in response to the request (e.g., the second UE may not generate multiple information/reports for each SCI of the more than one SCI).

In some examples, if (and/or when) (i) the second UE detects and/or receives more than one SCI comprising a message (e.g., a message comprising a request for inter-UE coordination information/message), and (ii) the more than one SCI are associated with (e.g., are for) different MAC PDUs and/or different TB s, the second UE may not consider (and/or may not expect) the message to be the same in each SCI of the more than one SCI. In some examples, when the message in each SCI of the more than one SCI comprises a request (e.g., a request for inter-UE coordination information/message), the second UE may consider to be requested more than once. Fields and/or content in different requests of the more than one SCI may be different (e.g., fields and/or content in a first request of one SCI of the more than one SCI may be partially or fully different than fields and/or content in a second request of another SCI of the more than one SCI). The second UE may generate more than one information/report (e.g., more than one inter-UE coordination information/message) in response to the requests (e.g., the multiple different requests) of the more than one SCI.

Concept C

In Concept C, a first UE may transmit a first SCI to one or more UEs comprising a second UE, wherein the first SCI schedules a first PSSCH transmission for transmitting a MAC PDU (e.g., the first SCI may allocate at least one first PSSCH resource for the first PSSCH transmission comprising transmission of the MAC PDU). The first UE may transmit a message (in addition to transmitting the first SCI and/or the MAC PDU, for example), wherein the message is included (e.g., multiplexed) in the MAC PDU. In some examples, the message may comprise information associated with a fourth priority value (and/or the message may comprise additional information in addition to the information associated with the fourth priority value). In some examples, the MAC PDU may comprise the message (e.g., the MAC PDU may only comprise the message). Alternatively and/or additionally, the MAC PDU may comprise data associated with one or more logical channels (e.g., the MAC PDU may comprise the message and the data associated with the one or more logical channels). In some examples, the one or more logical channels are associated with (e.g., configured with) same enabled SL HARQ feedback or same disabled SL HARQ feedback (e.g., for all of the one or more logical channels, SL HARQ feedback may be either enabled or disabled). In some examples, the message is a MAC CE or is included (e.g., multiplexed) in a MAC CE. In some examples, the message is for requesting inter-UE coordination information. In some examples, the information associated with the fourth priority value is for assisting (and/or may be usable by) the second UE for providing the inter-UE coordination information (e.g., the second UE may utilize the information associated with the fourth priority value to provide the inter-UE coordination information). In some examples, an issue is how the first UE sets a value of a priority field in the first SCI for the MAC PDU comprising the message. For example, in some systems, the UE may be unable to set the value of the priority field, which may prevent the first SCI and/or the MAC PDU comprising the message from being processed in a timely and/or efficient manner. Thus, the present disclosure provides one or more concepts, mechanisms, methods and/or embodiments that enable the UE to set the value of the priority field and/or solve the issue.

In some examples, the highest priority among the one or more logical channels may be associated with a third priority value. The third priority value may be the lowest priority value among priority values for the one or more logical channels.

In some examples, the first UE may set a value of a priority field in the first SCI based on a lowest priority value among a plurality of priority values comprising a priority value for the message and priority values for the one or more logical channels. For example, the first UE may set the value of the priority field to the lowest priority value among the plurality of priority values (e.g., the value of the priority field may be equal to the lowest priority value among the plurality of priority values).

Alternatively and/or additionally, the first UE may set the value of the priority field in the first SCI based on the third priority value (e.g., the lowest priority value among the priority values for the one or more logical channels). For example, the first UE may set the value of the priority field based on the third priority value based on the third priority value being the lowest priority value among the priority values for the one or more logical channels. The first UE may set the value of the priority field based on the third priority value without consideration of the priority value for the message (e.g., the UE may not consider the priority and/or the priority value for the message when setting the value of the priority field based on the third priority value). In an example, the first UE may set the value of the priority field to the third priority value (e.g., the value of the priority field may be equal to the third priority value).

Alternatively and/or additionally, the first UE may set the value of the priority field in the first SCI based on the priority value for the message (without consideration of the priority values for the one or more logical channels, for example). For example, the first UE may set the value of the priority field to the priority value for the message (e.g., the value of the priority field may be equal to the priority value for the message).

In an example, the priority value for the message may be associated with (e.g., the same as) the fourth priority value. In an example, the priority value for the message may be defined (e.g., fixed, specified, configured and/or pre-configured). In an example in which the priority value is a configured value, the priority value for the message may be provided (e.g., configured) in a configuration for inter-UE coordination. For example, the first UE may be configured with the priority value for the message by being configured with the configuration for inter-UE coordination, which may indicate the priority value for the message. In an example, the priority value for the message may be the lowest priority value (e.g., 1) among a defined set of priority values. In an example, the defined set of priority values may correspond to a set of specified, configurable and/or available priority values (e.g., a set of configurable priority values for sidelink). In an example, the defined set of priority values may comprise integers ranging from the lowest priority value (e.g., 1) to a highest priority value (e.g., 8). In an example, the priority value for the message may be the second lowest priority value (e.g., a priority value, such as 2, that is higher than the lowest priority value but lower than other priority values of the defined set of priority values).

For example, when the first UE requests inter-UE coordination information with priority value 3 (e.g., when the fourth priority value is 3), the first UE may set the value of the priority field in the first SCI in accordance with one, some and/or all of the following: (i) when there is available data with a highest priority value of 4, the first UE may set the value of the priority field in the first SCI to 1 (e.g., the priority value for the message may be the lowest priority value 1 among the defined set of priority values), (ii) when there is available data with highest priority value of 4, the first UE may set the value of the priority field in the first SCI to 3 (e.g., the priority value for the message may be the fourth priority value 3), (iii) when there is no available data, the first UE may set the value of the priority field in the first SCI to 1 (e.g., the priority value for the message may be the lowest priority value 1 among the defined set of priority values), (iv) when there is available data with a highest priority value of 2, the first UE may set the value of the priority field in the first SCI to 2 (e.g., the priority value for the message may be the fourth priority value 3), (v) when there is available data with a highest priority value of 2, the first UE may set the value of the priority field in the first SCI to 1 (e.g., the priority value for the message may be the lowest priority value 1 among the defined set of priority values), and/or (vi) when there is no available data, the first UE may set the value of the priority field in the first SCI to 3 (e.g., priority value for the message may be 3). In the present disclosure, the term "available data" may refer to data (associated with a logical channel, for example) that is available for transmission (e.g., sidelink transmission).

In some examples, the first SCI may comprise a first first-stage SCI and a first second-stage SCI (and/or may comprise additional information in addition to the first first-stage SCI and the first second-stage SCI). In some examples, the first UE transmits the first first-stage SCI and the first second-stage SCI to one or more UEs comprising the second UE, wherein the first first-stage SCI and the first second-stage SCI schedule the first PSSCH transmission for transmitting the MAC PDU (e.g., the first first-stage SCI and the first second-stage SCI may allocate the at least one first PSSCH resource for the first PSSCH transmission compris-ing transmission of the MAC PDU). The first UE may transmit the message (in addition to transmitting the first first-stage SCI, the first second-stage SCI and the MAC PDU, for example), wherein the message is included (e.g., multiplexed) in the first second-stage SCI.

The priority field in the first SCI may be in the first first-stage SCI (e.g., the first first-stage SCI may comprise the priority field and/or the priority field may correspond to a field of the first first-stage SCI).

In some examples, embodiments disclosed herein, such as embodiments described with respect to Concept A, Concept B and/or Concept C, may be implemented independently and/or separately. Alternatively and/or additionally, a combination of embodiments described herein, such as embodiments described with respect to Concept A, Concept B and/or Concept C, may be implemented. Alternatively and/or additionally, a combination of embodiments described herein, such as embodiments described with respect to Concept A, Concept B and/or Concept C, may be implemented concurrently and/or simultaneously.

Various techniques, embodiments, methods, concepts and/or alternatives of the present disclosure may be performed independently and/or separately from one another. Alternatively and/or additionally, various techniques, embodiments, methods, concepts and/or alternatives of the present disclosure may be combined and/or implemented using a single system. Alternatively and/or additionally, various techniques, embodiments, methods, concepts and/or alternatives of the present disclosure may be implemented concurrently and/or simultaneously.

With respect to one or more embodiments herein, such as one or more techniques, devices, concepts, methods, example scenarios and/or alternatives described above, in some examples, the first UE may perform sensing in a sidelink resource pool for generating the inter-UE coordination information/message. The first UE may monitor/receive/detect SCIs in the sidelink resource pool and/or may acquire and/or identify reserved resources of one or more other UEs via one or more received SCI from the one or more other UEs.

With respect to one or more embodiments herein, in some examples, for sidelink, a lower priority value may correspond to (e.g., may be indicative of) a higher priority.

With respect to one or more embodiments herein, in some examples, a smaller priority value (associated with SL MAC CE, sidelink data, and/or sidelink logical channel, for example) corresponds to (e.g., is indicative of) a higher priority. In an example, a priority value equal to 1 corresponds to (e.g., is indicative of) a highest priority, while a priority value equal to 8 corresponds to (e.g., is indicative of) a lowest priority.

With respect to one or more embodiments herein, in some examples, when a first priority value of a first sidelink MAC CE/data/logical channel is smaller than a second priority value of a second sidelink MAC CE/data/logical channel, a priority of the first sidelink MAC CE/data/logical channel is higher than a priority of the second sidelink MAC CE/data/logical channel. Alternatively and/or additionally, a sidelink MAC CE/data/logical channel with highest priority may be set to (and/or configured with) a lowest priority value (e.g., a fixed value equal to 0 or 1). In the present disclosure, the term "MAC CE/data/logical channel" may refer to a MAC CE, data and/or logical channel. For example, the first sidelink MAC CE/data/logical channel may comprise a sidelink MAC CE, sidelink data and/or a sidelink logical channel.

With respect to one or more embodiments herein, in some examples, the inter-UE coordination information/message may correspond to (e.g., may be and/or may refer to) an inter-UE coordination information report. In some examples, the inter-UE coordination information/message may correspond to (e.g., may be and/or may refer to) a scheme 1 inter-UE coordination information report. In some examples, the inter-UE coordination information/message may correspond to (e.g., may be and/or may refer to) an inter-device coordination information.

With respect to one or more embodiments herein, in some examples, a UE may generate an inter-UE coordination information/message (e.g., one inter-UE coordination information/message) in response to receiving a request (e.g., one request), wherein the request may be received from one or more other UEs (e.g., one or more paired UEs). In some examples, a UE may generate an inter-UE coordination information/message (e.g., one inter-UE coordination information/message) in response to the UE detecting and/or determining a condition is satisfied (e.g., generation of the inter-UE coordination information/message may be condition-triggered).

With respect to one or more embodiments herein, in some examples, the PSSCH transmission from a UE may correspond to (e.g., may be and/or may refer to) sidelink data transmission. In some examples, the PSSCH transmission from the UE may be device-to-device transmission. The PSSCH transmission may be utilized for transmitting a data packet, a TB, and/or a MAC PDU. A MAC CE may be included in a MAC PDU, a TB and/or a data packet. The MAC PDU may correspond to (e.g., may be and/or may refer to) a data packet and/or a TB.

With respect to one or more embodiments herein, in some examples, a UE monitoring a slot may comprise the UE monitoring/receiving/detecting SCI (e.g., all sidelink control information) in the slot in the sidelink resource pool.

With respect to one or more embodiments herein, the sidelink transmission from a UE may correspond to (e.g., may be and/or may refer to) a PSCCH transmission.

With respect to one or more embodiments herein, in some examples, the SCI may be delivered in PSCCH (and/or in one or more other channels in addition to PSCCH). In some examples, the SCI may comprise first-stage SCI. In some examples, the first-stage SCI may be transmitted via PSCCH. In some examples, the SCI may comprise second-stage SCI. In some examples, the second-stage SCI may be transmitted via multiplexing the second-stage SCI with PSSCH. In some examples, the SCI format 1 is a first-stage SCI. In some examples, the SCI format 2-A is a second-stage SCI. In some examples, the SCI format 2-B is a second-stage SCI.

With respect to one or more embodiments herein, in some examples, the slot may correspond to (e.g., may be and/or may refer to) a sidelink slot. In some examples, the slot may be represented as and/or replaced with a TTI. In some examples, in the present disclosure, one, some and/or all instances of the term "slot" may be replaced with the term "TTI".

With respect to one or more embodiments herein, in some examples, the sidelink slot may correspond to (e.g., may be and/or may refer to) slot for sidelink. In some examples, a TTI may be a subframe (for sidelink, for example), a slot (for sidelink, for example) or a sub-slot (for sidelink, for example). In some examples, a TTI comprises multiple symbols, e.g., 12, 14 or other number of symbols. In some examples, a TTI may be a slot comprising sidelink symbols (e.g., the slot may fully/partially comprise the sidelink symbols). In some examples, a TTI may correspond to (e.g., may be and/or may refer to) a transmission time interval for a sidelink transmission (e.g., a sidelink data transmission). In some examples, a sidelink slot (e.g., a slot for sidelink) may comprise orthogonal frequency-division multiplexing (OFDM) symbols (e.g., all OFDM symbols) available for sidelink transmission. In some examples, a sidelink slot (e.g., a slot for sidelink) may comprise a set of contiguous (e.g., consecutive) symbols that are available for sidelink transmission. In some examples, a sidelink slot (e.g., a slot for sidelink) may correspond to (e.g., may be and/or may refer to) a slot that is included in a sidelink resource pool.

With respect to one or more embodiments herein, in some examples, the symbol may correspond to (e.g., may be and/or may refer to) a symbol indicated/configured for sidelink.

With respect to one or more embodiments herein, in some examples, the slot may correspond to (e.g., may comprise and/or may refer to) a sidelink slot associated with the sidelink resource pool. In some examples, the slot may not correspond to (e.g., may not comprise and/or may not refer to) a sidelink slot associated with a different sidelink resource pool (different than the sidelink resource pool).

With respect to one or more embodiments herein, in some examples, there may be one or more sidelink resource pools in a sidelink BWP and/or a sidelink carrier/cell.

With respect to one or more embodiments herein, in some examples, the sidelink data (e.g., first sidelink data) may correspond to (e.g., may comprise and/or may refer to) a TB. In some examples, the sidelink data may correspond to (e.g., may comprise and/or may refer to) a MAC PDU. In some examples, the sidelink data may correspond to (e.g., may comprise and/or may refer to) a data packet (e.g., a first data packet).

With respect to one or more embodiments herein, in some examples, the sidelink data (e.g., first sidelink data) is associated with a sidelink logical channel (and/or one or more other channels in addition to the sidelink logical channel). In some examples, the sidelink data comprises data from a sidelink logical channel (and/or one or more other channels in addition to the sidelink logical channel).

With respect to one or more embodiments herein, in some examples, a sub-channel is a unit for sidelink resource allocation and/or scheduling (e.g., sidelink resource allocation and/or scheduling for PSSCH). In some examples, a sub-channel may comprise multiple contiguous Physical Resource Blocks (PRBs) in frequency domain. In some examples, the number of PRBs for each sub-channel may be configured (e.g., pre-configured) for a sidelink resource pool. In some examples, a sidelink resource pool configuration (e.g., a sidelink resource pool pre-configuration) may indicate and/or configure the number of PRBs for each sub-channel. In some examples, the number of PRBs for a sub-channel (e.g., each sub-channel of one, some and/or all sub-channels of the sidelink resource pool) may be 4, 5, 6, 8, 9, 10, 12, 15, 16, 18, 20, 25, 30, 48, 50, 72, 75, 96, 100, and/or other value. In some examples, a sub-channel may be represented as a unit for sidelink resource allocation and/or scheduling. In some examples, a sub-channel may correspond to (e.g., may be and/or may refer to) a PRB. In some examples, a sub-channel may correspond to (e.g., may be and/or may refer to) a set of contiguous (e.g., consecutive) PRBs in frequency domain. In some examples, a sub-channel may correspond to (e.g., may be and/or may refer to) a set of contiguous (e.g., consecutive) resource elements in frequency domain.

With respect to one or more embodiments herein, in some examples, the resource reservation period value may be in units of milliseconds. In some examples, the resource reservation period value may be in units of slots for determining (e.g., deriving) periodic occasions of periodic sidelink data resources. In some examples, the resource reservation period value may be converted (from units of milliseconds, for example) to units of slots to determine (e.g., derive) periodic occasions of periodic sidelink data resources (e.g., based on the reservation period value, a period of the periodic sidelink data resources may be determined to be Q, wherein Q is in units of slots).

With respect to one or more embodiments herein, in some examples, the first UE acquires resource reservation information from one or more other UEs via one or more received SCIs from the one or more other UEs. In some examples, the one or more received SCIs from the one or more other UEs comprises resource reservation information of the one or more other UEs.

With respect to one or more embodiments herein, in some examples, a UE may correspond to (e.g., may comprise and/or may refer to) a device. In some examples, in the present disclosure, one, some and/or all instances of the term "UE" may be replaced with the term "device".

With respect to one or more embodiments herein, in some examples, a sidelink transmission/reception may be a UE-to-UE transmission/reception, a device-to-device transmission/reception, a Vehicle-to-Everything (V2X) transmission/reception, a Pedestrian-to-Everything (P2X) transmission/reception, and/or a transmission/reception performed on PC5 interface.

With respect to one or more embodiments herein, in some examples, the PC5 interface may be a wireless interface for communication between devices (e.g., communication between a first device and a second device), a wireless interface for communication between UEs, and/or a wireless interface for V2X communication and/or P2X communication. In some examples, the Uu interface may be a wireless interface for communication between a network node and a device and/or a wireless interface for communication between a network node and a UE.

With respect to one or more embodiments herein, in some examples, the first UE may be a first device, UE-A and/or UE-B. In some examples, the first UE may be a vehicle UE. In some examples, the first UE may be a V2X UE.

With respect to one or more embodiments herein, in some examples, the second UE may be a second device, UE-B and/or UE-A. In some examples, the second UE may be a vehicle UE. In some examples, the second UE may be a V2X UE.

One, some and/or all of the foregoing examples, concepts, techniques, methods and/or embodiments can be formed and/or combined to a new embodiment.

Figure 8:
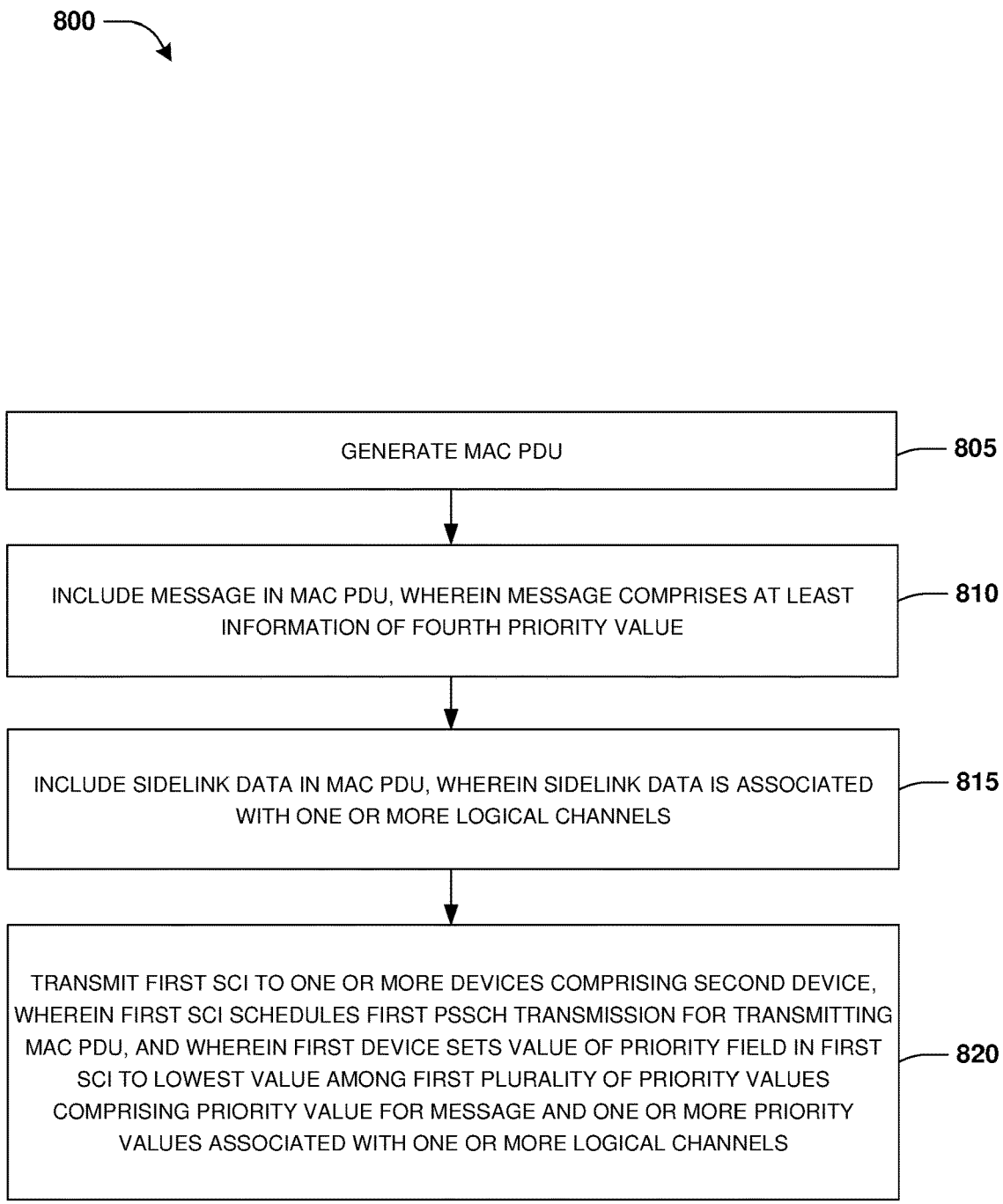
FIG. 8 is a flow chart according to one exemplary embodiment.

FIG. 8 is a flow chart 800 according to one exemplary embodiment from the perspective of a first device. In step 805, the first device generates a MAC PDU. In step 810, the first device includes a message in the MAC PDU, wherein the message comprises at least information of a fourth priority value. For example, the first device may multiplex the message in the MAC PDU. In step 815, the first device includes sidelink data in the MAC PDU, wherein the sidelink data is associated with one or more logical channels. For example, the first device may multiplex the sidelink data in the MAC PDU. In step 820, the first device transmits a first SCI to one or more devices comprising a second device, wherein the first SCI schedules a first PSSCH transmission for transmitting the MAC PDU, and wherein the first device sets a value of a priority field in the first SCI to a lowest value among a first plurality of priority values comprising (i) a priority value for the message, and (ii) one or more priority values associated with the one or more logical channels. For example, the priority field may be indicative of the lowest value among the first plurality of priority values.

In one embodiment, the first SCI allocates at least one first PSSCH resource for the first PSSCH transmission. For example, the first PSSCH transmission (comprising transmission of the MAC PDU, for example) may be performed using the at least one first PSSCH resource.

In one embodiment, a highest priority among the one or more logical channels is associated with a third priority value (e.g., among the one or more priority values associated with the one or more logical channels, the third priority value is indicative of the highest priority), wherein the first device sets the value of the priority field in the first SCI to a lowest value among the priority value for the message and the third priority value. For example, the priority field may be indicative of the lowest value among the priority value for the message and the third priority value. In some examples, the third priority value (indicative of the highest priority among the one or more priority values associated with the one or more logical channels) is the lowest priority value among the one or more priority values.

In one embodiment, the priority value for the message is the fourth priority value.

In one embodiment, the priority value for the message is defined (e.g., fixed, specified, configured and/or pre-configured).

In one embodiment, the first SCI comprises a first first-stage SCI and a first second-stage SCI (and/or comprises additional content in addition to the first first-stage SCI and the first second-stage SCI).

In one embodiment, the priority field is in the first first-stage SCI.

In one embodiment, the message is a MAC CE.

In one embodiment, the message is included (e.g., multiplexed) in a MAC CE.

Referring back to FIGS. 3 and 4, in one exemplary embodiment of a first device, the device 300 includes a program code 312 stored in the memory 310. The CPU 308 may execute program code 312 to enable the first device (i) to generate a MAC PDU, (ii) to include a message in the MAC PDU, wherein the message comprises at least information of a fourth priority value, (iii) to include sidelink data in the MAC PDU, wherein the sidelink data is associated with one or more logical channels, and (iv) to transmit a first SCI to one or more devices comprising a second device, wherein the first SCI schedules a first PSSCH transmission for transmitting the MAC PDU, and wherein the first device sets a value of a priority field in the first SCI to a lowest value among a first plurality of priority values comprising (A) a priority value for the message, and (B) one or more priority values associated with the one or more logical channels. Furthermore, the CPU 308 can execute the program code 312 to perform one, some and/or all of the above-described actions and steps and/or others described herein.

Figure 9:
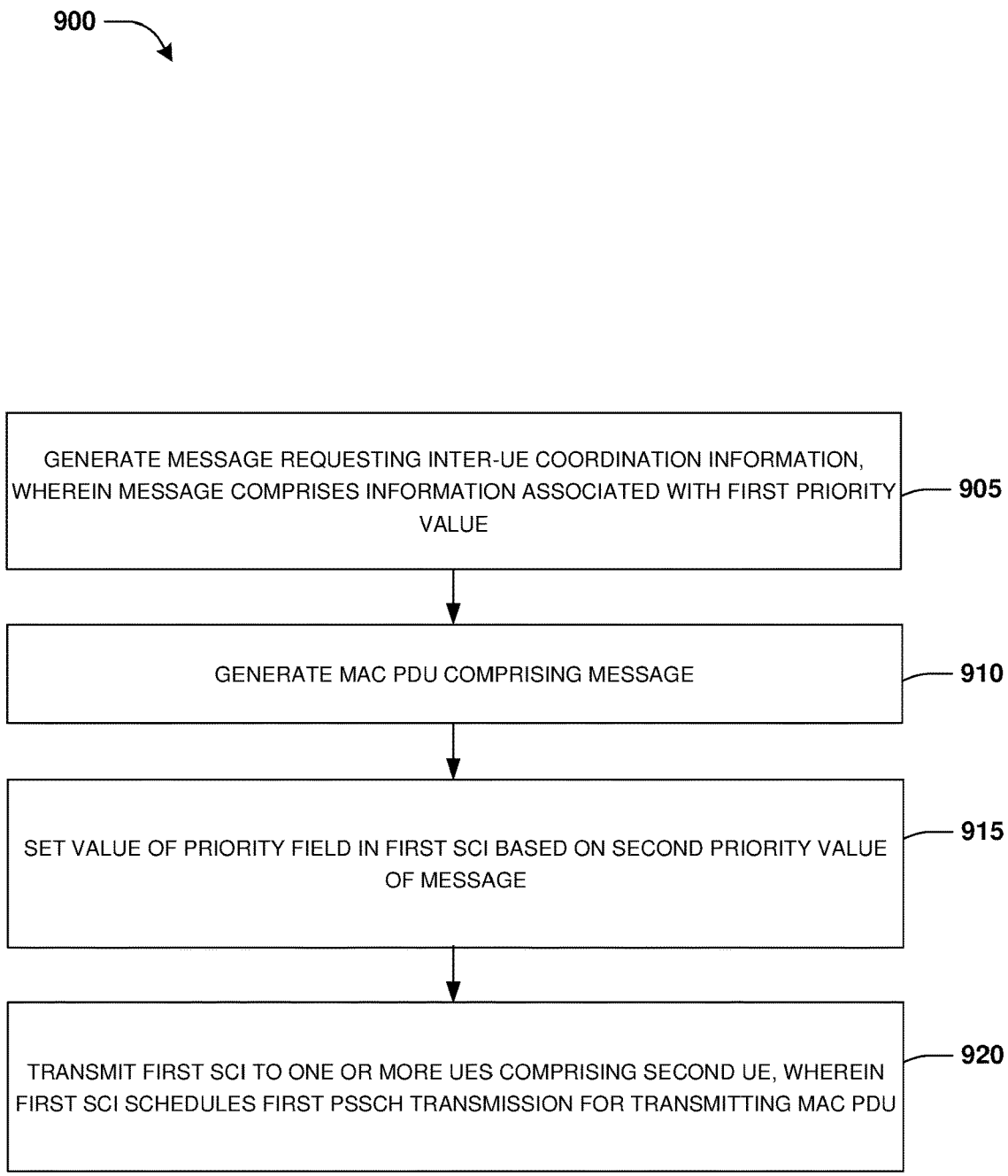
FIG. 9 is a flow chart according to one exemplary embodiment.

FIG. 9 is a flow chart 900 according to one exemplary embodiment from the perspective of a first UE. In step 905, the first UE generates a message requesting inter-UE coordination information, wherein the message comprises information associated with a first priority value. The information associated with the first priority value may be indicative of the first priority value. The message may comprise a field indicative of the first priority value. In some examples, the message may comprise additional information (in addition to the information associated with the first priority value). The additional information may comprise a number of sub-channels and/or a resource reservation interval. In step 910, the first UE generates a MAC PDU comprising the message. In step 915, the first UE sets a value of a priority field in a first SCI based on a second priority value of the message (and/or based on other information in addition to the second priority value of the message). In step 920, the first UE transmits the first SCI to one or more UEs comprising a second UE, wherein the first SCI schedules a first PSSCH transmission for transmitting the MAC PDU.

In one embodiment, the information associated with the first priority value is usable by the second UE for providing (e.g., generating and/or transmitting) the inter-UE coordination information (e.g., the information associated with the first priority value may be for assisting the second UE in providing the inter-UE coordination information). For example, the second UE may utilize the information associated with the first priority value for providing (e.g., generating and/or transmitting) the inter-UE coordination information (e.g., the second UE may generate and/or transmit the inter-UE coordination information based on the first priority value). Alternatively and/or additionally, the second UE may utilize the additional information in the message (e.g., the number of sub-channels and/or the resource reservation interval) for providing (e.g., generating and/or transmitting) the inter-UE coordination information (e.g., the second UE may generate and/or transmit the inter-UE coordination information based on the number of sub-channels and/or the resource reservation interval). In an example, the second UE may use the first priority value, the number of sub-channels and/or the resource reservation interval for performing a sidelink transmission (e.g., a PSCCH transmission and/or a PSSCH transmission) comprising the inter-UE coordination information. In an example, the second UE may prioritize the sidelink transmission according to the first priority value.

In one embodiment, the message is a first MAC CE for requesting the inter-UE coordination information. For example, the first MAC CE may comprise a request for the inter-UE coordination information.

In one embodiment, the second priority value of the message is a configured value and/or a lowest priority value among a defined set of priority values. In an example, the defined set of priority values may correspond to a set of specified, configurable and/or available priority values (e.g., a set of configurable priority values for sidelink). In an example, the defined set of priority values may comprise integers ranging from the lowest priority value (e.g., 1) to a highest priority value (e.g., 8). In some examples, a lower priority value in the defined set of priority values may indicate a higher priority than a higher priority value in the defined set of priority values. For example, the lowest priority value in the defined set of priority values may indicate a highest priority among the defined set of priority values. The highest priority value in the defined set of priority values may indicate a lowest priority among the defined set of priority values.

In one embodiment, the configured value is provided (e.g., configured) in a configuration for inter-UE coordination (e.g., the first UE may be configured with the configured value by being configured with the configuration for inter-UE coordination, which may indicate the configured value). The second priority value may be set to the configured value based on the configuration for inter-UE coordination.

In one embodiment, the second priority value of the message is 1. For example, the second priority value of the message may be defined as 1 (e.g., the second priority value may be fixed to 1, and/or may be specified, configured and/or pre-configured as 1). For example, the second priority value of the message being the lowest priority value (among the defined set of priority values) corresponds to (e.g., may comprise and/or may refer to) the second priority value of the message being defined as 1. In some examples, the second priority value of the message is defined as 1 (e.g., the lowest value among the defined set of priority values) based on the message comprising a request for the inter-UE coordination information. For example, the first UE may automatically set priority values of messages (e.g., MAC CEs) that comprise requests for inter-UE coordination information to 1 (e.g., the lowest value among the defined set of priority values).

In one embodiment, the lowest priority value among the defined set of priority values is 1.

In one embodiment, the first priority value is different than the second priority value of the message.

In one embodiment, the second priority value of the message corresponds to the first priority value. For example, the second priority value of the message may be set to (e.g., assigned as) the first priority value (e.g., the UE may set the second priority value of the message to the first priority value based on the message comprising information associated with the first priority value).

In one embodiment, setting the value of the priority field (in the SCI) based on the second priority value of the message comprises setting the value of the priority field to the second priority value (e.g., the value of the priority field may be equal to the second priority value).

In one embodiment, the MAC PDU comprises sidelink data associated with one or more sidelink logical channels, wherein the UE sets the value of the priority field in the first SCI based on a lowest priority value among priority values comprising the second priority value of the message and one or more priority values of the one or more sidelink logical channels. For example, the UE may set the value of the priority field to the lowest priority value among the priority values.

In one embodiment, generating the MAC PDU comprises multiplexing the message and sidelink data, associated with one or more sidelink logical channels, in the MAC PDU (e.g., the UE may include the message and the sidelink data in the MAC PDU), wherein the UE sets the value of the priority field in the first SCI based on a lowest priority value among the second priority value of the message and one or more priority values of the one or more sidelink logical channels. For example, the UE may set the value of the priority field to the lowest priority value among the priority values.

In one embodiment, the first SCI comprises a first-stage SCI (e.g., SCI format 1-A) and a second-stage SCI (e.g., SCI format 2-A or SCI format 2-B), wherein the first-stage SCI comprises the priority field, and wherein the second-stage SCI comprises the information of the first priority value.

In one embodiment, the MAC PDU comprises a sidelink CSI reporting MAC CE and/or a sidelink DRX command MAC CE, wherein generating the MAC PDU comprises (i) prioritizing, for inclusion in the MAC PDU, the sidelink CSI reporting MAC CE over the first MAC CE, and/or (ii) prioritizing, for inclusion in the MAC PDU, the first MAC CE over the sidelink DRX command MAC CE. In an example, based on the sidelink CSI reporting MAC CE being prioritized over the first MAC CE, the UE may include (e.g., multiplex) the sidelink CSI reporting MAC CE in the MAC PDU before including (e.g., multiplexing) the first MAC CE in the MAC PDU. Alternatively and/or additionally, based on the first MAC CE being prioritized over the sidelink DRX command MAC CE, the UE may include (e.g., multiplex) the first MAC CE in the MAC PDU before including (e.g., multiplexing) the sidelink DRX command MAC CE in the MAC PDU.

In one embodiment, when the first UE includes (e.g., multiplexes) the first MAC CE and a sidelink CSI reporting MAC CE in the MAC PDU, the sidelink CSI reporting MAC CE is prioritized over the first MAC CE.

In one embodiment, when the first UE includes (e.g., multiplexes) the first MAC CE and a sidelink DRX command MAC CE in the MAC PDU, the first MAC CE is prioritized over the sidelink DRX command MAC CE.

In one embodiment, generating the MAC PDU comprises multiplexing, in the MAC PDU, the first MAC CE and (i) a sidelink CSI reporting MAC CE and/or (ii) a sidelink DRX command MAC CE. During the multiplexing, the UE (i) prioritizes, for inclusion in the MAC PDU, the sidelink CSI reporting MAC CE over the first MAC CE, and/or (ii) prioritizes, for inclusion in the MAC PDU, the first MAC CE over the sidelink DRX command MAC CE.

In one embodiment, a priority value of the sidelink CSI reporting MAC CE is 1. For example, the priority value of the sidelink CSI reporting MAC CE may be defined as 1 (e.g., the priority value may be fixed to 1, and/or may be specified, configured and/or pre-configured as 1). For example, the UE may automatically set priority values of sidelink CSI reporting MAC CEs to 1.

In one embodiment, a priority value of the sidelink DRX command MAC CE is 1. For example, the priority value of the sidelink DRX command MAC CE may be defined as 1 (e.g., the priority value may be fixed to 1, and/or may be specified, configured and/or pre-configured as 1). For example, the UE may automatically set priority values of sidelink DRX command MAC CEs to 1.

In one embodiment, the sidelink CSI reporting MAC CE does not comprise information associated with a priority value (e.g., the sidelink CSI reporting MAC CE may not comprise a priority value).

In one embodiment, the sidelink DRX command MAC CE does not comprise information associated with a priority value (e.g., the sidelink DRX command MAC CE may not comprise a priority value).

In one embodiment, the UE multiplexes the message in the MAC PDU.

In one embodiment, the first SCI allocates at least a first PSSCH resource for transmitting the MAC PDU (e.g., the first PSSCH resource may be allocated for the first PSSCH transmission). For example, the first UE may perform the first PSSCH transmission (comprising transmission of the MAC PDU, for example) on the first PSSCH resource (e.g., one PSSCH resource allocated by the first SCI for transmitting the MAC PDU).

Referring back to FIGS. 3 and 4, in one exemplary embodiment of a first UE, the device 300 includes a program code 312 stored in the memory 310. The CPU 308 may execute program code 312 to enable the first UE (i) to generate a message requesting inter-UE coordination information, wherein the message comprises information associated with a first priority value, (ii) to generate a MAC PDU comprising the message, (iii) to set a value of a priority field in a first SCI based on a second priority value of the message, and (iv) to transmit the first SCI to one or more UEs comprising a second UE, wherein the first SCI schedules a first PSSCH transmission for transmitting the MAC PDU. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 8-9. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 8-9, and/or one, some and/or all of the above-described actions and steps and/or others described herein.

It may be appreciated that applying one or more of the techniques presented herein may result in one or more benefits including, but not limited to, increased efficiency of communication between devices (e.g., UEs). The increased efficiency may be a result of enabling the devices to handle SL priority value for inter-UE coordination information and/or requests for inter-UE coordination information, thereby improving Quality of Service (QoS), preventing negative impacts on latency and/or reliability, and/or satisfying one or more QoS requirements.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first User Equipment (UE), the method comprising:
generating a message requesting inter-UE coordination information, wherein the message comprises information associated with a first priority value;
generating a Medium Access Control (MAC) Protocol Data Unit (PDU) comprising the message;
setting a value of a priority field in a first sidelink control information (SCI) based on a second priority value of the message, wherein the second priority value of the message is a configured value; and
transmitting the first SCI to one or more UEs comprising a second UE, wherein the first SCI schedules a first Physical Sidelink Shared Channel (PSSCH) transmission for transmitting the MAC PDU.

2. The method of claim 1, wherein at least one of:
the information associated with the first priority value is usable by the second UE for providing the inter-UE coordination information;
the message is a first MAC Control Element (CE) for requesting the inter-UE coordination information; or
the configured value is provided in a configuration for inter-UE coordination.

3. The method of claim 2, wherein:
the MAC PDU comprises at least one of a sidelink Channel State Information (CSI) reporting MAC CE or a sidelink Discontinuous Reception (DRX) command MAC CE; and
the generating the MAC PDU comprises at least one of:
prioritizing, for inclusion in the MAC PDU, the sidelink CSI reporting MAC CE over the first MAC CE; or
prioritizing, for inclusion in the MAC PDU, the first MAC CE over the sidelink DRX command MAC CE.

4. The method of claim 3, wherein at least one of:
a priority value of the sidelink CSI reporting MAC CE is 1;
a priority value of the sidelink DRX command MAC CE is 1;
the sidelink CSI reporting MAC CE does not comprise information associated with a priority value; or
the sidelink DRX command MAC CE does not comprise information associated with a priority value.

5. The method of claim 2, wherein the generating the MAC PDU comprises:

multiplexing, in the MAC PDU, the first MAC CE and at least one of a sidelink Channel State Information (CSI) reporting MAC CE or a sidelink Discontinuous Reception (DRX) command MAC CE; and during the multiplexing, at least one of:
prioritizing, for inclusion in the MAC PDU, the sidelink CSI reporting MAC CE over the first MAC CE; or
prioritizing, for inclusion in the MAC PDU, the first MAC CE over the sidelink DRX command MAC CE.

6. The method of claim 1, wherein:
the first priority value is different than the second priority value of the message.

7. The method of claim 1, wherein:
the MAC PDU comprises sidelink data associated with one or more sidelink logical channels; and
the setting the value of the priority field in the first SCI is performed based on a lowest priority value among the second priority value of the message and one or more priority values of the one or more sidelink logical channels.

8. The method of claim 1, wherein:
the first SCI comprises a first-stage SCI and a second-stage SCI;
the first-stage SCI comprises the priority field; and
the second-stage SCI comprises the information associated with the first priority value.

9. The method of claim 1, wherein:
the generating the MAC PDU comprises multiplexing the message in the MAC PDU.

10. The method of claim 1, wherein:
the first SCI allocates at least a first PSSCH resource for transmitting the MAC PDU; and
the method comprises performing the first PSSCH transmission on the first PSSCH resource.

11. The method of claim 1, wherein:
the generating the MAC PDU comprises multiplexing the message and sidelink data, associated with one or more sidelink logical channels, in the MAC PDU; and
the setting the value of the priority field in the first SCI is performed based on a lowest priority value among the second priority value of the message and one or more priority values of the one or more sidelink logical channels.

12. A method of a first User Equipment (UE), the method comprising:
generating a message requesting inter-UE coordination information, wherein the message comprises information associated with a first priority value;
generating a Medium Access Control (MAC) Protocol Data Unit (PDU) comprising the message;
setting a value of a priority field in a first sidelink control information (SCI) based on a second priority value of the message, wherein the second priority value of the message corresponds to the first priority value; and
transmitting the first SCI to one or more UEs comprising a second UE, wherein the first SCI schedules a first Physical Sidelink Shared Channel (PSSCH) transmission for transmitting the MAC PDU.

13. The method of claim 12, wherein at least one of:
the information associated with the first priority value is usable by the second UE for providing the inter-UE coordination information; or
the message is a first MAC Control Element (CE) for requesting the inter-UE coordination information.

14. The method of claim 13, wherein:
the MAC PDU comprises at least one of a sidelink Channel State Information (CSI) reporting MAC CE or a sidelink Discontinuous Reception (DRX) command MAC CE; and
the generating the MAC PDU comprises at least one of:
prioritizing, for inclusion in the MAC PDU, the sidelink CSI reporting MAC CE over the first MAC CE; or
prioritizing, for inclusion in the MAC PDU, the first MAC CE over the sidelink DRX command MAC CE.

15. The method of claim 14, wherein at least one of:
a priority value of the sidelink CSI reporting MAC CE is 1;
a priority value of the sidelink DRX command MAC CE is 1;
the sidelink CSI reporting MAC CE does not comprise information associated with a priority value; or
the sidelink DRX command MAC CE does not comprise information associated with a priority value.

16. The method of claim 12, wherein:
the MAC PDU comprises sidelink data associated with one or more sidelink logical channels; and
the setting the value of the priority field in the first SCI is performed based on a lowest priority value among the second priority value of the message and one or more priority values of the one or more sidelink logical channels.

17. The method of claim 12, wherein:
the first SCI comprises a first-stage SCI and a second-stage SCI;
the first-stage SCI comprises the priority field; and
the second-stage SCI comprises the information associated with the first priority value.

18. The method of claim 12, wherein:
the generating the MAC PDU comprises multiplexing the message in the MAC PDU.

19. A User Equipment (UE), the UE comprising:
a control circuit;
a processor installed in the control circuit; and
a memory installed in the control circuit and operatively coupled to the processor, wherein the processor is configured to execute a program code stored in the memory to perform operations, the operations comprising:
generating a message requesting inter-UE coordination information, wherein the message comprises information associated with a first priority value;
generating a Medium Access Control (MAC) Protocol Data Unit (PDU) comprising the message;
setting a value of a priority field in a first sidelink control information (SCI) based on a second priority value of the message, wherein the second priority value of the message is a configured value; and
transmitting the first SCI to one or more UEs comprising a second UE, wherein the first SCI schedules a first Physical Sidelink Shared Channel (PSSCH) transmission for transmitting the MAC PDU.

20. The UE of claim 19, wherein at least one of:
the information associated with the first priority value is usable by the second UE for providing the inter-UE coordination information; or
the message is a first MAC Control Element (CE) for requesting the inter-UE coordination information.

* * * * *